United States Patent
König et al.

(10) Patent No.: US 12,038,822 B2
(45) Date of Patent: Jul. 16, 2024

(54) TENANT DATABASE PLACEMENT IN OVERSUBSCRIBED DATABASE-AS-A-SERVICE CLUSTER

(71) Applicant: Microsoft Technology Licensing, LLC, Redmond, WA (US)

(72) Inventors: Arnd Christian König, Kirkland, WA (US); Vivek Ravindranath Narasayya, Redmond, WA (US); Yi Shan, Bellevue, WA (US); Tobias Ziegler, Weinheim (DE); Aarati Kakaraparthy, Madison, WI (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 477 days.

(21) Appl. No.: 17/355,891

(22) Filed: Jun. 23, 2021

(65) Prior Publication Data
US 2022/0413986 A1  Dec. 29, 2022

(51) Int. Cl.
G06F 11/34 (2006.01)
G06F 9/50 (2006.01)

(52) U.S. Cl.
CPC ........ G06F 11/3433 (2013.01); G06F 9/5016 (2013.01); G06F 9/505 (2013.01)

(58) Field of Classification Search
CPC ..... G06F 11/3433; G06F 9/5016; G06F 9/505
See application file for complete search history.

(56) References Cited

U.S. PATENT DOCUMENTS

| | | | | |
|---|---|---|---|---|
| 9,400,731 | B1* | 7/2016 | Preece | G06F 11/3447 |
| 2014/0059232 | A1* | 2/2014 | Plattner | H04L 67/1029 |
| | | | | 709/226 |
| 2016/0321588 | A1 | 11/2016 | KÖnig et al. | |
| 2022/0382721 | A1* | 12/2022 | Muthukrishnan | H04L 67/1012 |

OTHER PUBLICATIONS

Taft et al., "STeP: Scalable Tenant Placement for Managing Database-as-a-Service Deployments", In Proceedings of the Seventh ACM Symposium on Cloud Computing, Oct. 5, 2016, pp. 388-400.*
Bernstein, et al., "Adapting Microsoft SQL Server for Cloud Computing", In Proceedings of the IEEE 27th International Conference on Data Engineering, Apr. 11, 2011, pp. 1255-1263.
"International Search Report and Written Opinion Issued in PCT Application No. PCT/US22/030455", dated Aug. 19, 2022, 13 Pages.

* cited by examiner

*Primary Examiner* — Manuel L Barbee
(74) *Attorney, Agent, or Firm* — Newport IP, LLC; Jacob P. Rohwer

(57) ABSTRACT

Placement of a tenant database in an oversubscribed, database-as-a-service cluster comprised of a plurality of nodes is described. The placement may be based on per-node estimates of a probability of resource demand violation if the tenant database is placed on the node. Past resource usage of similar tenant databases subscribed to the cluster that are collected and stored as compressed traces may be used to obtain the estimates. In some examples, based on the estimates, a per-node expected number of resource violations is determined and compared across nodes, where the determined placement minimizes the number of resource violations. In other examples, when the tenant database is being placed in parallel with other tenant databases, a score assigned to each valid configuration for the placement may be modified based on the estimates, where the determined placement is the configuration having a lowest score.

20 Claims, 12 Drawing Sheets

700

---

Algorithm 1 The MODIFIED BESTFIT Algorithm
---
procedure PLACETENANTBESTTFIT(Tenant $db$)
    $Candidates := \emptyset$
    for all $n \in Nodes$ do
        $S_n := \{$ All databases currently placed on node $n\}$.
        if $Pr_{violation}(S_n \cup \{db\}) < \theta$ then
            $Candidates := Candidates \cup \{n\}$
        else
            $Delta_n := Pr_{violation}(S_n \cup \{db\}) - Pr_{violation}(S_n)$
            if $Pr_{violation}(S_n \cup \{db\}) == 1$ then
                $Delta_n := \infty$ // Node cannot accommodate $db$
            end if
        end if
    end for
    if $Candidates \neq \emptyset$ then
        for all $n \in Candidates$ do
            $\overline{node\_load_n} = (\overline{node\_load_n^{r_1} + tenant\_load_{db,0}^{r_1}}, \ldots, \overline{node\_load_n^{r_\circ} + tenant\_load_{db,0}^{r_\circ}})$
        end for
        $DestinationNode := \arg\max_{i \in Candidates} W(\overline{node\_load_i})$
    else
        $DestinationNode := \arg\min_{i \in Nodes} Delta_i$
    end if
    Return $DestinationNode$
end procedure

FIGURE 7

Algorithm 2 The MODIFIED WORSTFIT Algorithm procedure PLACETENANTWORSTFIT(Tenant $db$)
 $Candidates := \emptyset$
 $HeldOut\_Cand := \emptyset$
 $HeldOut\_Nodes := \arg\min_{\mathcal{H} \subseteq Nodes, |\mathcal{H}|=M} \sum_{i \in \mathcal{H}} W(node\_load_i)$
 for all $n \in Nodes$ do
  $S_n := \{$ All databases currently placed on node $n\}$.
  if $Pr_{violation}(S_n \cup \{db\}) < \theta$ then
   if $n \in HeldOut\_Nodes$ then
    $HeldOut\_Cand := HeldOut\_Cand \cup \{n\}$
   else
    $Candidates := Candidates \cup \{n\}$
   end if
  else
   $Delta_n := Pr_{violation}(S_n \cup \{db\}) - Pr_{violation}(S_n)$
   if $Pr_{violation}(S_n \cup \{db\}) == 1$ then
    $Delta_n := \infty$ // Node cannot accommodate $db$
   end if
  end if
 end for
 for all $n \in Candidates \cup HeldOut\_Cand$ do
  $\overline{node\_load_n} := \overline{(node\_load_n^{r_1} + tenant\_load_{db,0}^{r_1}, \ldots, node\_load_n^{r_S} + tenant\_load_{db,0}^{r_S})}$
 end for
 if $Candidates \neq \emptyset$ then
  $DestinationNode := \arg\max_{i \in Candidates} W(\overline{node\_load_i})$
 else
  if $HeldOut\_Cand \neq \emptyset$ then
   $DestinationNode := \arg\min_{i \in HeldOut\_Cand} W(\overline{node\_load_i})$
  else
   $DestinationNode := \arg\min_{i \in Nodes} Delta_i$
  end if
 Return $DestinationNode$

FIGURE 8

TENANT DATABASE PLACEMENT IN OVERSUBSCRIBED DATABASE-AS-A-SERVICE CLUSTER

BACKGROUND

In a database-as-a-service architecture, rather than tenants having their own databases on premise, the tenants purchase or subscribe to databases hosted by the service, where the service provisions the databases (also referred to herein as tenant databases) in the cloud to the tenants. For example, the tenant databases are hosted on nodes within a cluster of the service, where the nodes have particular resource capacities.

Controlling cost, and thereby the price of subscription passed onto the tenants, can be a challenge for such services. As one solution, resources in a cluster can be oversubscribed, thereby increasing tenant density and lowering costs. Oversubscription is possible because tenants typically only consume a fraction of the maximum amount of resources that they are entitled to. However, with oversubscription it then becomes possible for the aggregate resource demand on a node within the cluster to exceed the node's resource capacity, which is known as a resource violation. Resource violations may be resolved by failovers during which one or more tenant databases are moved to other nodes in the cluster. Failovers can be highly disruptive.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for tenant database placement in an oversubscribed, database-as-a-service cluster. The cluster may be comprised of a plurality of nodes configured to host tenant databases. The placement may be based on per-node estimates of a probability of resource violation if the tenant database is placed on the node. Past resource demand of similar tenant databases subscribed to the cluster that are collected and stored as traces may be used to obtain the estimates. The traces may be compressed prior to storage to conserve storage space and reduce computational processing when selected and replayed to obtain the estimates. For example, for a given node, a probability of resource violation for a candidate set of co-located databases on the node may be estimated. The candidate set includes at least the tenant database to be placed. The candidate set may also include one or more other tenant databases currently hosted on the node. In some examples, a plurality of simulations (e.g. Monte-Carlo simulations) may be performed. For example, for each co-located tenant database, a trace may be sampled from a subset of the traces associated with tenant databases having shared characteristics with the respective co-located tenant database and replayed. For each of the simulations, a trace may be sampled from the subset and replayed to predict a resource demand, the predicted resource demand may be aggregated among the co-located tenant databases to determine if the candidate set would result in a resource violation, and the estimate for the given node may be the resulting percentage of the simulations where a resource violation occurred.

In some examples, to determine the placement of the tenant database based on the probability of resource violation estimates, a per-node increase in probability of violation if the tenant database is placed on the node is determined and compared across nodes, where the tenant database may be placed on the node having the lowest increase in the total number of expected resource violations within the cluster. In examples where the comparison yields multiple nodes having a same lowest increase in probability of resource violation (and therefore expected number of violations), a modified heuristic can be applied to determine a node from the multiple nodes on which the tenant database is placed. The modified heuristic may be a best-fit or worst-fit heuristic, for example.

In other examples, when the tenant database is being placed in parallel with one or more other tenant databases, a scoring function may be implemented to assign scores to candidate configurations for tenant database placement within the cluster. A candidate configuration with the lowest score may be selected and the tenant databases may be moved to in order to realize the selected candidate configuration. The scoring function may be modified based on the probability of resource violation estimates. For example, the score for a given candidate configuration may be based on a first number of failovers required to transition from the current configuration to the target candidate configuration and a second number of failovers expected from resource violations given the target candidate configuration, the second number being based on the probability of resource violation estimates. The score may then be further adjusted by adding a first penalty based on whether any tenant database is placed on a held-out node in the configuration (e.g., a node that is strategically left empty or free of tenant databases) and/or a second penalty based on whether resource demand across the nodes is imbalanced in the configuration, respectively. The configuration having a lowest assigned score may be selected and the cluster manager may then move or place tenants in order to realize the selected configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 7 is one example modified heuristic algorithm applied for determining tenant database placement.

FIG. 8 is another example modified heuristic algorithm applied for determining tenant database placement.

DETAILED DESCRIPTION

As discussed above, the present disclosure describes systems and methods for tenant database placement in a database-as-a-service cluster utilizing probability of resource violation estimates for nodes across the cluster. A probability of a resource violation on a node given a candidate set of tenant databases co-located on the node may be estimated by randomly sampling and replaying, using simulations, historical traces of resource demand for tenant databases that are similar to (e.g., have shared characteristics with) the co-located tenant databases within the candidate set. Because storing and replaying the traces can require large storage requirements and be computationally expensive, respectively, the traces may be compressed. The probability of resource violation estimates may then be leveraged to determine a placement of one or more tenant databases to minimize resource violations, and thus failovers.

Accordingly, the present disclosure provides a plurality of technical benefits that are expounded upon throughout the disclosure. First, utilizing probability of resource violation estimates rather than exact point predictions of resource usage by tenant databases, and accounting for uncertainty by repeatedly sampling, replaying, and aggregating resource demand using simulations in a principled manner, tenant database placement may be optimized over conventional approaches for tenant database placement. Additionally, by compressing traces, both storage space requirements and computational processing costs can be reduced without losing efficacy in the probability of resource violation estimates. Further, minimal changes, and particularly no architectural changes, to the database-as-a-service environment may be required (e.g., no additional hardware or storage resources may be required). Rather, to determine tenant database placement, techniques may be modified to incorporate or leverage the probability of resource violation estimates. As one example, existing heuristics such as best-fit and word-fit heuristics may be modified to include the probability of resource violation estimations. As another example, a scoring function utilized to determine a best configuration, among enumerated configurations, for placing multiple tenant databases in parallel may be modified to include the probability of resource violation estimations.

Figure 1:
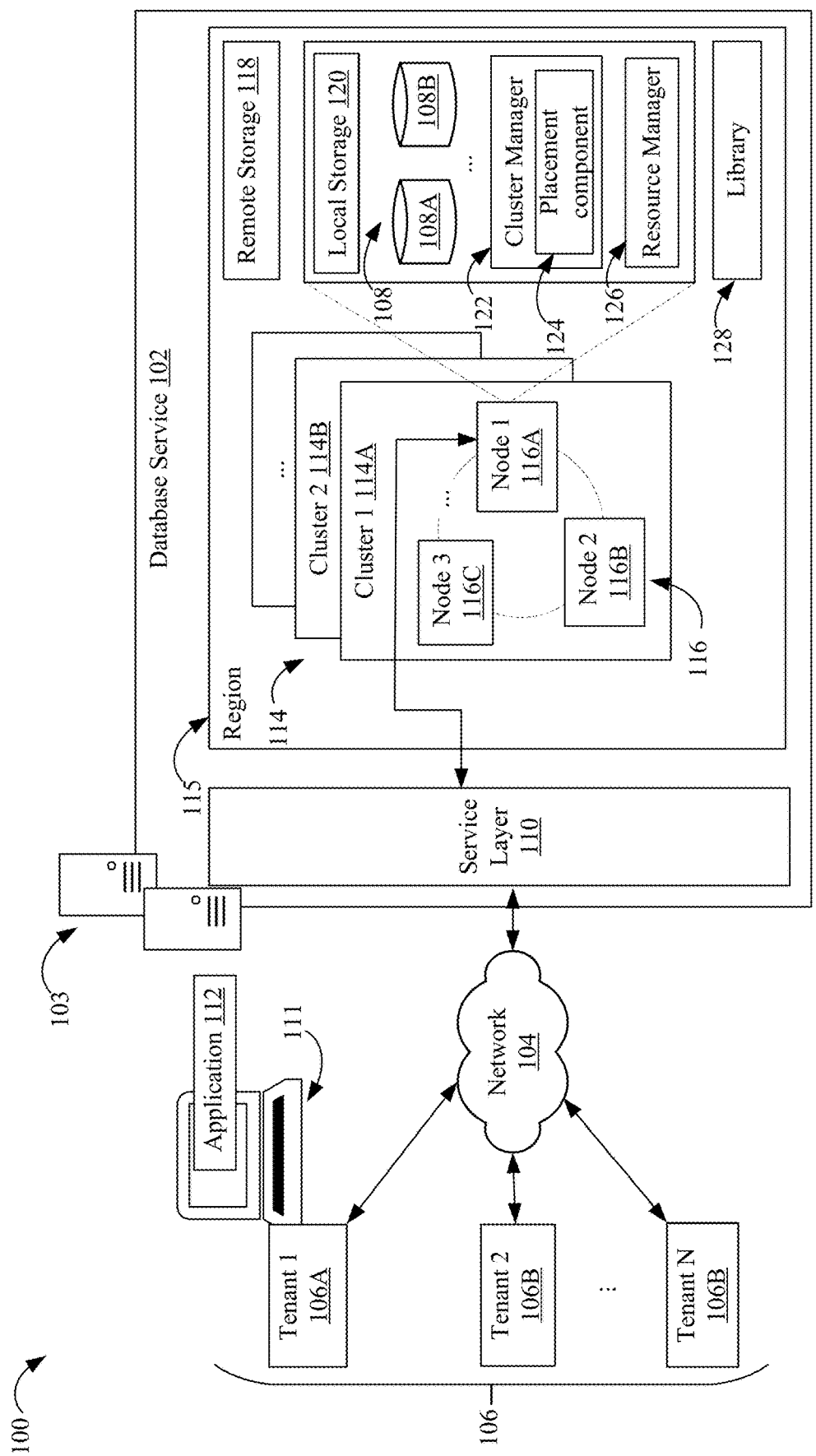
FIG. 1 illustrates an overview of an example database-as-a-service system.

FIG. 1 illustrates an overview of an example database-as-a-service system 100, hereinafter system 100, in which aspects of this disclosure can be implemented. In some aspects, system 100 comprises a database service 102, hereinafter service 102, made available by a plurality of servers 103. The service 102 may include a cloud database that is run on a cloud computing platform, where access to the cloud database is provided as-a-service to a plurality of clients, such as tenants 106, over a network 104. An example of the service 102 may be the AZURE SQL DATABASE service that is run on the AZURE cloud computing platform from the Microsoft Corporation of Redmond, Washington Tenants 106 may purchase (e.g., pay a subscription fee to rent) tenant databases 108 from the service 102. For example, a first tenant 106A may be a new tenant that is renting first tenant database 108A. The service 102 may provision and maintain the databases 108 in the cloud to the tenants 106. The tenants 106 may have their own interfaces via which the tenant databases 108 can be accessed through a service layer 110 of the service 102. For example, each of the tenants 106 may comprise a group of users, where at least a portion of the group of users may utilize computing devices, such as computing device 111 associated with the first tenant 106A, for accessing the service 102 over the network 104. For example, using the computing device 111, a user may execute an application 112 associated with the service 102 that is locally installed on the computing device 111 or access a web application associated with the service 102 through a web browser running on the computing device 111.

The service 102 may include a plurality of clusters 114 (e.g., a first cluster 114A, a second cluster 114B, etc.). In some examples, at least a subset of the clusters 114 may form a region 115, where the region 115 may correspond to a geographical region. Each of the clusters 114 may include a plurality of nodes 116 (e.g., first node 116A, second node 116B, third node 116C, etc.), at least a portion of which are configured to host one or more of the tenant databases 108 within the cluster 114. Some nodes 116 may be "held out" nodes that do not host any of the tenant databases (e.g., the nodes may be strategically left empty for reason discussed in more detail below). In some examples, the nodes 116 are arranged in a ring, as illustrated.

Multiple tenants 106 may share a same node 116 physically, while being isolated as separate process running their own private database management system (DBMS) instance, the DBMS instance being data stored in respective tenant databases 108 hosted on the node 116 at a given time. For example, when a new tenant, such as the first tenant 106A, subscribes to the service 102, the service 102 provisions database software and space for the tenant data to be stored in a cluster 114. As illustrated, software and space for the first tenant database 108A may be provisioned to the first tenant 106 on the first node 116A of the first cluster 114A. The first node 116A may also host a plurality of other tenant databases associated with other tenants, such as second tenant database 108B that is associated with a different tenant than the first tenant 106A, such as second tenant 106B.

For some database offerings, there may be one or more database replicas available to the tenants 106, where a greater number of database replicas increases an availability of the service 102 to the tenants 106. A database replica may store a database image. In some examples, the database image may be stored in a remote data store (e.g., in remote storage 118), which is more cost efficient but is slower to access. In other examples, the database image may be stored locally on the node 116 that the tenant database 108 is hosted on. For example, the database image of the database replica associated with the first tenant database 108A that is hosted on the first node 116A may be stored in local storage 120 of the first node 116A. Tenants 106 may be categorized into different tenant classes. In some examples, a tenant class may be alternatively known as a service level objective (SLO). The tenant class or service level may specify a maximum amount of resources available to the tenant, and whether the database image of the database replica is to be stored in remote storage 118 or local storage 120, for example. In some examples, the tenant class also defines a billing model for the tenant (e.g., serverless vs. provisioned).

As previously discussed, each cluster 114 of the service 102 has a plurality of nodes 116. A node 116 of a cluster 114 can host 0, 1, or multiple tenant databases 108. Each of the tenants may have one or multiple database replicas for respective tenant databases 108 that vary significantly in size based on an amount of resources utilized. Example types of resources utilized include central processing unit (CPU), local memory, and disk space, among other similar resource types. In some examples, all resources on a node 116 may be shared seamlessly between tenant databases 108 hosted on the node 116. The tenant databases 108 may arrive and depart dynamically, freeing up resources on a node 116 when they depart. However, lifetimes of the tenant databases 108 (e.g., how long the tenant rents the database from the service 102) are not known upfront, and may vary widely. For example, some lifetimes may only be several hours, whereas other lifetimes may extend several months. Additionally, the amount of resources utilized by each of the tenant databases 108 may vary significantly over their lifetimes with little to no correlation across the different resources.

To manage aspects of the clusters 114, the service 102 may further include a cluster manager 122. An example of the cluster manager 122 may be SERVICE FABRIC from the Microsoft Corporation of Redmond, Washington or KUBERNETES from the Cloud Native Computing Foundation, among other examples. Among other tasks, the cluster manager 122 may manage the placement of tenant databases 108 within the clusters 114. In some examples, the placement may be a result of a new tenant that has subscribed to the service 102, such as the first tenant 106A described as an illustrative example herein. In other examples, the placement may be a result of a failed node 116, where the cluster manager 122 is responsible for moving any of the tenant databases 108 residing on the failed node 116 to a different node 116 of the same cluster 114. In one example, the failed node 116 may be a result of an intentional bringing down of the node 116 (e.g., to upgrade the node 116). In other examples, the failed node 116 may be a result of a resource violation detected as discussed in more detail below.

The system 100 may further include a resource manager 126 for each node 116 to manage the distribution of resources. As previously discussed, all resources on a node 116 of a cluster 114 may be distributed or shared seamlessly across tenant databases 108 hosted on the node 116. Resultantly, the decision of which tenant databases 108 to co-locate on a node 116 made by the cluster manager 122 as part of placement management may be critical to resource management (e.g., to avoid resource violations and failovers discussed in detail below). In some examples, the cluster manager 122 may include a placement component 124 that manages tenant database placement. An example of the placement component 124 may include the placement and load balancing (PLB) component of SERVICE FABRIC from the Microsoft Corporation of Redmond, Washington Every tenant 106 has a maximum amount of resources the tenant 106 can use based on its respective tenant class, but tenants 106 typically only use a fraction of the resources they are entitled to. Therefore, if a simple reservation approach was implemented, where the maximum amount of resources for each tenant 106 was reserved on the node 116 hosting the respective tenant database 108, then many of the resources physically deployed on the node 116 would be idle. In turn, this would make the service 102 more expensive to run, and would cause the subscription to be more costly to the tenants 106. Additionally, serverless database offerings, provided as an alternative model to provisioned databases services, whose resource usage can scale significantly with the tenant's workload, have further exacerbated this issue.

As one example means to avoid this issue, resources are oversubscribed. For example, when a node 116 is oversubscribed, if the maximum amount of resources for all tenants 106 having tenant databases 108 hosted on the node 116 are added together, this amount would breach the resource capacity of the node 116. However, because tenants 106 typically only use a fraction of the resources they are entitled to, breach of that node's capacity is unlikely. In some aspects, to ensure that this breach remains unlikely, one or more maximum oversubscription ratios may be defined. For example, there may be a first hard cap or limit on the aggregate oversubscription ratio for an entire cluster 114, and a second hard cap or limit on the aggregate oversubscription ratio on a node 116 for that cluster 114, where the second hard cap or limit for the node is a higher ratio than the first hard cap or limit for the entire cluster (allowing more oversubscription on a node than the cluster). In addition to lowering costs of running the service 102 and thus costs passed onto the tenants 106, by oversubscribing, there is more flexibility in dealing with emergencies. For example, if multiple nodes 116 of a cluster 114 fail (e.g., go down) at a same time, the tenant databases 108 on these failed nodes 116 can be re-distributed without loss of availability while the nodes 116 are brought back up again.

However, oversubscription also has drawbacks. If tenant databases 108 co-located on a node 116, such as first tenant database 108A and second tenant database 108B co-located on the first node 116A, each use a significant fraction of resources that the respective tenants 106 are entitled to, there may not be enough resources to satisfy the demand (e.g., there may be a likelihood that the node's capacity could be breached). A resource violation occurs when aggregate resource usage on a node 116 reaches a resource violation threshold. When that resource violation threshold is reached, one or more tenant databases 108 may begin to be moved, by the cluster manager 122, to different, less busy nodes 116 in order to stave off any resource shortage before a breach of resource capacity actually occurs on the node 116. Movement of a tenant database 108 under these circumstances is known as a failover. Failovers generally involve the movement of tenant databases 108 among nodes 116 of a same cluster 114, however, in some instances, the tenant databases 108 may be failed over to different clusters 114 of the region 115.

In addition to failovers implying that a tenant 106 has not received the resources that it purchased (e.g., implying a contractual breach), failovers have several negative impacts on performance and tenant availability. For example, any of the tenant databases 108 being moved are required to be restarted. As a result, if a user is interacting with one of those tenant databases 108, any queries issued may be canceled and will need to be subsequently re-issued by the tenant 106 once the tenant database 108 is restarted. Additionally, a state of the cache contents of the tenant databases 108 may be lost leading to temporary performance degradation as the caches are re-populated. For example, data is brought from disk into memory (e.g., via disk reads) to pre-compute certain data structures used, where the pre-computed data structures are stored as part of the cache contents. When failover occurs, the cache has to be populated again, so this incurs repetition of the disk reads and pre-computations, which can be computationally expensive and time consuming. Further, while attempts are made to only move tenant databases 108 that are not currently being used, this is not always possible, potentially causing the failover to result in unavailability of the service 102 for a short period of time.

Given these negative impacts of failovers, it is desirable to incur as few failovers as possible and thus limit a number of resource violations that trigger the failovers. Other approaches to limiting resource violations often focus on determining point predictions of (future) resource demands of a given tenant database that is to be placed. As one illustrative example commonly used in industrial practice, whenever a tenant database 108 is placed within a cluster 114, a current snapshot of the resource load on every node 116 of the cluster 114 is captured, a point estimate for the resources that the new tenant database will use is determined, and a heuristic that minimizes a cluster imbalance (e.g., to prevent resource load imbalance across the nodes 116 of the cluster 114) is then applied to determine where to place the tenant database 108 given the determined estimate and current resource load snapshot. For example, the new tenant database 108 may be placed on a least-loaded node 116 capable of accommodating the estimated resource usage of the new tenant database 108. However, this approach disregards the dynamic nature of resource usage by tenant databases 108 over time, including unknown lifetimes of the tenant databases. Additionally, accurate point estimates for the resources to be utilized by tenant databases 108, specifically when the tenant database 108 is new and limited information is known, are inherently difficult. For example, when the tenant database 108 is new, only an associated tenant class may be known which is generally insufficient to accurately predict future resource usage by the new tenant database 108.

Alternative other approaches have been developed to account for the dynamic nature of the arrival and departure of tenant databases 108 as a well as the variable changes in resource demand over time. However, these alternative approaches suffer from other inefficiencies or challenges. As a first example, variants of packing algorithms that account for dynamic tenant database lifetimes as well as changes in resource demand have been developed in the theory community. The algorithms may use variations of (vector) bin-packing to maintain tenant packings that are competitive with off-line bin-packing schemes, while providing worst-case bounds on a number of failovers required for different types of changes such as a new tenant database placement, a tenant database departure or a significant change in resource demand. Because the algorithms prioritize the density of the packing, these resulting bounds on failovers can be impractical for implementation in real-life environments, such as in system 100.

As another example, tenant consolidation techniques have been developed that initially observe the demand of each tenant database 108 for a minimum time period and subsequently consolidate tenant databases 108 with anti-correlated usage patterns on a smaller set of nodes 116. However, the consolidation requires failing over all new tenant databases 108 at least once, again making this technique impractical given the negative impacts of failovers. Additionally, because a significant fraction of tenant database 108 are relatively short-lived (e.g., existing or only a few hours or less) a large number of the tenant databases 108 may exist for less than the minimum time period over which the demand is observed before consolidation.

As a further example, machine learning-based approaches have been developed to predict how resource usage is going to change over time. For example, using machine learning, values of future resource usage for each of the co-located tenant databases 108 on a node 116 may be predicted, these values may be added to determine aggregate usage, and a determination may be made as to whether that aggregate usage will result in a resource violation (e.g., will result in a value above the resource violation threshold). Placement of a tenant database 108 may then be guided based on whether a resource violation will be likely to result. Although this alternative machine-learning approach considers the dynamic nature of resource usage by tenant databases 108 over time, there are still challenges to this prediction given the limited knowledge about new tenant databases 108 when they are being placed. Additionally, even for existing tenant databases 108, predicting future demand requires observations over a period of time, and the existing tenant database 108 may already be re-placed before the period of time needed to observe passes. Further, as discussed above it is challenging to predict tenant database lifetimes, and these lifetimes directly impact aggregate resource usage on node.

To overcome the deficiencies and challenges of these above-described conventional approaches for tenant database placement in oversubscribed clusters of a database-as-a service, methods and systems are described herein for tenant database placement based on probability of resource violation estimates. For example, as described in FIG. 2, based on the assumption that future resource demands will be distributed similar to past distributions of resource demands among similar tenants (e.g., past tenant behavior informs future tenant behavior with respect to resource usage for similar tenants), rich historical data of resource demands may be collected and stored for different types of tenant databases having varied characteristics for use in estimating the probability of future resource violation. The historical data of resource demands may be traces that are collected and stored as a configuration file, for example, in a library 128 stored external from but accessible by other components of the service 102, including at least the cluster manager 122 and the placement component 124 thereof. In some examples, the traces may be in the form of, and may be alternatively referred to herein, as resource demand curves.

Select traces may be used to estimate, per node 116, the probability of a (future) resource violation given a candidate set of tenant databases 108 co-located on the node 116, the candidate set including a tenant database 108 to be placed and any other tenant databases 108 already placed on the node. In some examples, and as described in detail in FIGS. 3 and 4, Monte Carlo simulations may be performed to obtain the estimate using the select traces of resource demands. As part of a simulation, for each co-located tenant database of the candidate set, the select traces are repeatedly sampled from a subset of resource demands associated with types of tenant databases that are similar to (e.g., have shared characteristics with) the respective co-located tenant database. The sampled traces may be replayed in order to predict the resource demand for each respective co-located tenant database, where, in some example, traces of resource demand for multiple different resource types may be replayed in parallel. The predicted resource demands may be aggregated to determine whether a resource violation may result. The estimate of the probability of resource violation may then be based on the resource violations detected across these simulations. In some examples, and as described in detail in FIG. 5, compressed traces may be utilized to obtain the estimate, where the traces may be compressed prior to storage in the library 128.

The probability of resource violation estimate for each node may then be used to determine the best overall tenant placement in order to minimize a number of resource violations. In turn, reducing the number of resource violations may help reduce a number of failovers. In some aspects, when multiple nodes have a lowest expected number of resource violations, existing heuristics used for tenant placement (e.g., best-fit or worst-fit heuristics) may be modified to incorporate the probability of resource violation estimates when determining placement of the tenant, as described in greater detail with reference to FIGS. 6, 7, and 8 below. In other aspects, when multiple tenants are being placed in parallel, the estimates may be integrated with a scoring function of the placement component 124, as described in greater detail with reference to FIGS. 9, 10, and 11 below. An additional consideration for tenant placement may be the minimization of resource fragmentation issues, which may also be accounted for by incorporating the estimates. Resource fragmentation issues may occur when a tenant database 108 of a rare tenant class that consumes a large fraction of the node's resources may arrive for placement in the cluster 114.

Therefore, the methods and systems described herein take into account the dynamic changes in resource demand over time without the requirement of having precise point predictions of future resource usage by tenant databases 108. Instead, by using Monte Carlo simulations (or other suitable simulations or models), uncertainty in resource demand (e.g., particularly in the case of newly placed tenant databases 108 for which little information is known) may be modeled and the uncertain estimates may be combined for different tenant databases in a principled way. For example, the underlying certainty is captured by reasoning over distribution of possible resource demand curves observed in past tenant behavior of similar tenants. Additionally, because the traces are replayed for multiple resource types in parallel during the Monte Carlo simulations, correlations among the resource types may be automatically captured, allowing placement decisions on more than just a single resource type.

Figure 5:
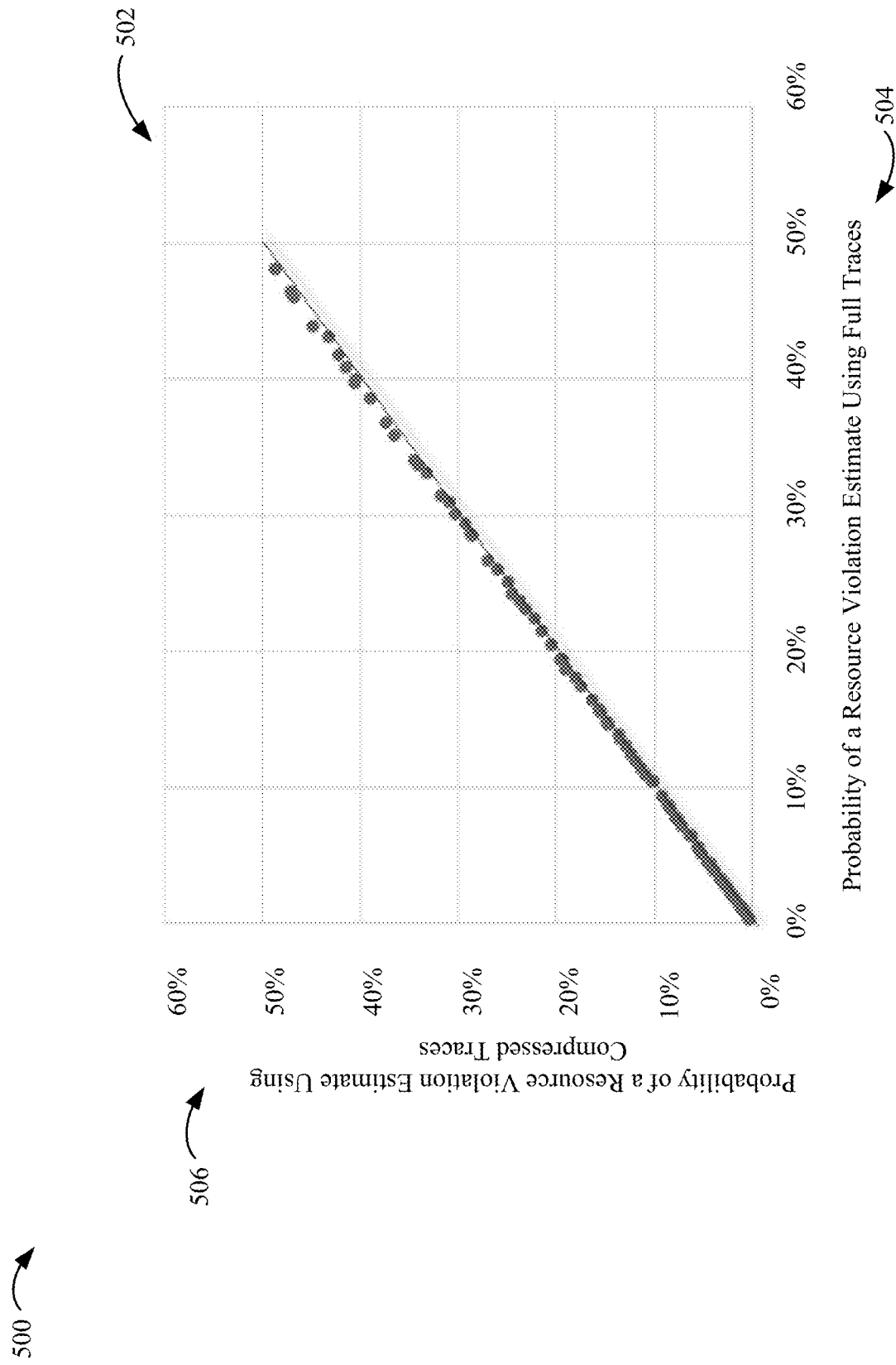
FIG. 5 is a diagram conceptually illustrating the efficacy of compressed traces of resource demand when used in probability of resource violation estimates.

Additionally, in order for the cluster manager 122 to perform the Monte Carlo simulations efficiently (e.g., with both low CPU and memory overheads), several optimizations may be implemented. For example, a first optimization may compress a size of the traces by multiple orders of magnitude without significantly affecting the resulting likelihood of resource violation estimates, as illustrated in FIG. 5. A second optimization may leverage properties of the compressed traces to reduce a number of time points for which Monte Carlo simulations are performed, and where possible, cache and re-use partial results from previous Monte Carlo iterations.

Further, minimal changes, to the database-as-a-service environment may be required for placing the tenant databases 108. For example, the cluster manager 122 and placement component 124 thereof only need to have access to the traces stored in the library 128 for use in the probability of resource violation estimates. Then, to determine tenant database placement, conventional techniques may be modified to incorporate or leverage the probability of resource violation estimates.

Figure 12:
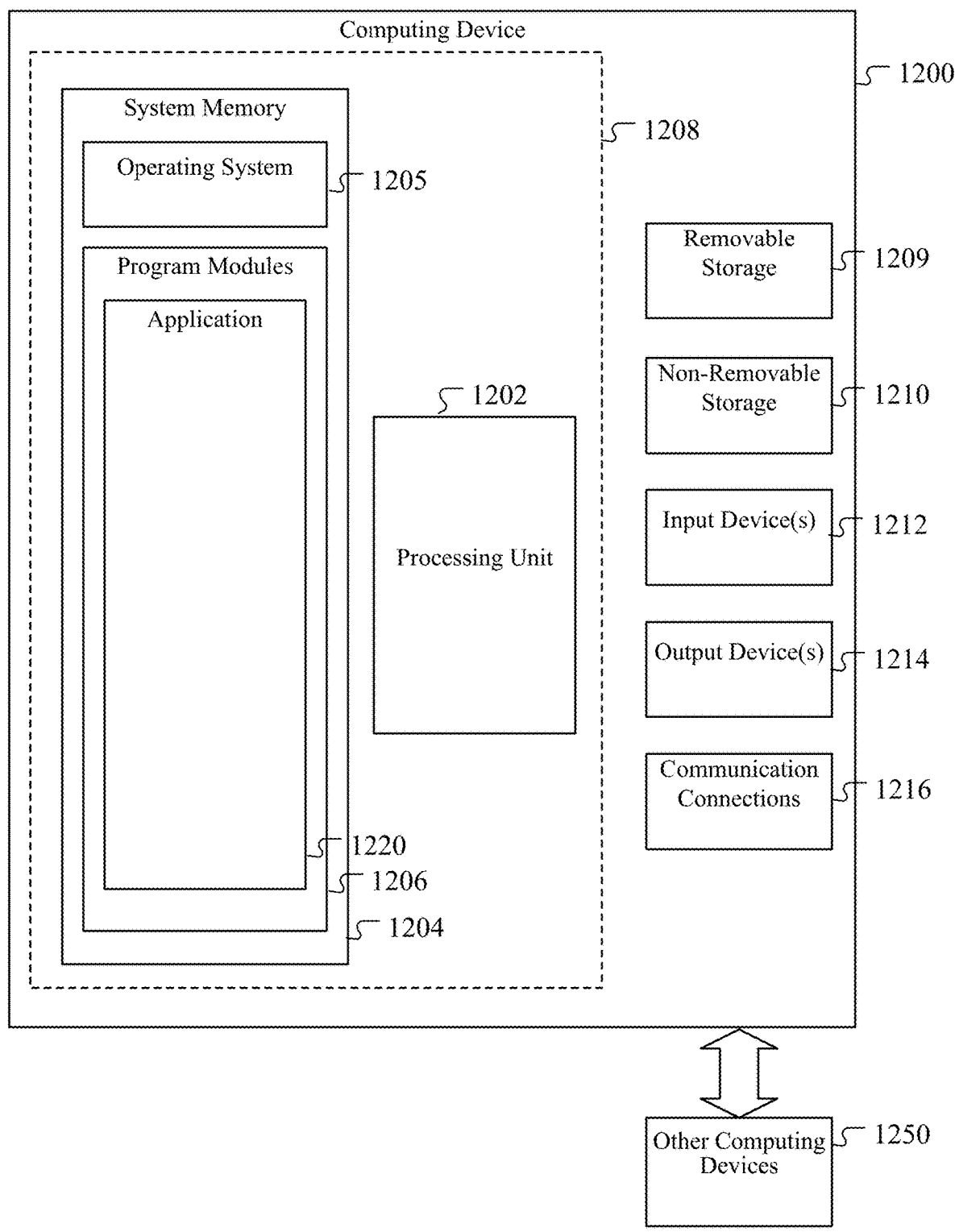
FIG. 12 is a block diagram illustrating example physical components of a computing device with which aspects of the disclosure may be practiced.

Example system 100 as presented is a combination of interdependent components that interact to form an integrated whole. Components of the system 100 may be hardware components or software components implemented on and/or executed by hardware components of the system 100. In some examples, the components of the system 100 disclosed herein may be distributed across multiple devices, as illustrated. For instance, applications running on client computing devices, such as application 112 running on computing device 111, may be utilized to access other devices in a network, such as one or more remote servers 103, that enable access to tenant databases 108 hosted by the service 102 via the service layer 110. FIG. 12 provides example processing devices of the system 100, such as the computing device 111 and the remote servers 103.

One of skill in the art will appreciate that the scale of systems such as system 100 may vary and may include additional or fewer components than those described in FIG. 1.

Figure 2:
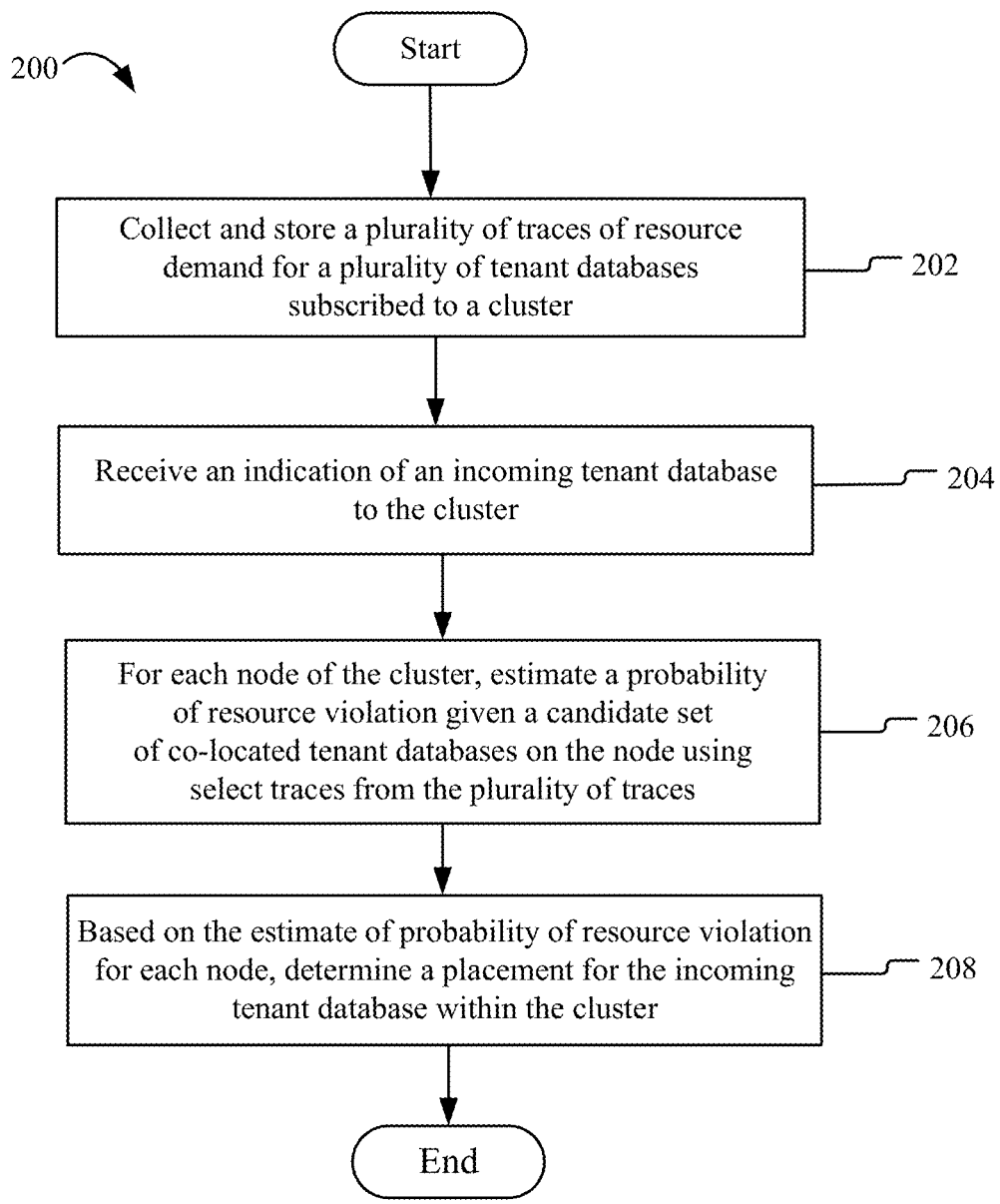
FIG. 2 illustrates an example method for placing tenant databases based on probability of resource violation estimates.

FIG. 2 illustrates an example method 200 for placing tenant databases based on probability of resource violation estimates. The method 200 may be provided by one or more components of the system 100 described in FIG. 1, such as the cluster manager 122 of the service 102.

The method 200 begins at operation 202 where a plurality of traces of resource demand for a plurality of tenant databases subscribed to the cluster are collected and stored. In some examples, the traces are stored in the library 128, where the traces may be in a form of resource demand curves (e.g., resources requested/used vs. time). Within the library 128, the traces can be grouped into subsets based on characteristics of the corresponding tenant databases. For example, for each tenant class of a plurality of tenant classes, the library 128 may include a subset of traces associated with tenant databases of that tenant class. The traces within this subset may quantify how the tenant databases of that tenant class have behaved in the past with respect to resource usage. Example resource demands captured in the traces can include CPU, local memory, and disk space. Each of the traces within the tenant class-specific subsets can further be filtered or broken down based on other tenant database characteristics, such as lifetime or resource usage. Additionally, and as described in greater detail with reference to FIG. 5 below, the traces may be compressed prior to storage in the library 128.

At operation 204, an indication of an incoming tenant database to the cluster may be received. In some examples, the incoming tenant database may be a new tenant database for which limited information is known. For example, a tenant class of the new tenant database may be one of the few characteristics known. In other examples, the incoming tenant database may be one the plurality of tenant databases already subscribed to the cluster (e.g., an existing tenant database). The existing tenant database may have been previously hosted on a node of the cluster where a resource violation was been detected, the node was brought down due to an upgrade, or the node otherwise failed, and thus a failover involving the movement of the existing tenant database to another node of the cluster is being performed by the cluster manager 122. Some additional information may be known for an existing tenant database based on observations recorded upon the database's arrival to the cluster, including lifetime (at least thus far) and past resource usage.

Based on the assumption that future resource demand will be distributed similar to past distributions of resource demands for similar tenants (e.g., past tenant behavior informs future tenant behavior with respect to resource usage for similar tenants), at operation 206, for each node of the cluster, a probability of resource violation given a candidate set of co-located tenant databases on the node may be estimated using select traces from the plurality of traces. The candidate set of co-located tenant databases may include the incoming tenant database and any existing tenant databases that are currently hosted on the node of the cluster.

The select traces may be sampled from specific subsets of traces for tenant databases having characteristics that correspond to each co-located tenant database of the candidate set. The characteristics can include at least tenant class. The characteristics may further include minimum lifetime and maximum resource usage for the co-located tenant database (e.g., if it is an existing tenant database for which observations have been collected for at least some period of time). As one illustrative example, and as described in more detail with reference to FIG. 3, a plurality of Monte Carlo simulations may be performed to repeatedly sample and replay the select traces, from the specific subsets of traces, in order to estimate the per-node probability of a resource violation occurring if the incoming tenant database is placed on the node. For example, for each simulation, a trace may be repeatedly sampled and replayed from the specific subset of traces for each co-located tenant database to predict a resource demand for the co-located tenant, the resource demand predicted for each co-located tenant database may be aggregated, and a determination whether the candidate set will result in a resource violation on the node given the aggregated resourced demand may be made. The probability of resource violation estimate may be a percentage of the simulations where a resource violation occurred.

At operation 208, based on the probability of resource violation estimate for each node, a placement for the tenant database is determined within the cluster in order to minimize future resource violations.

Figure 3:
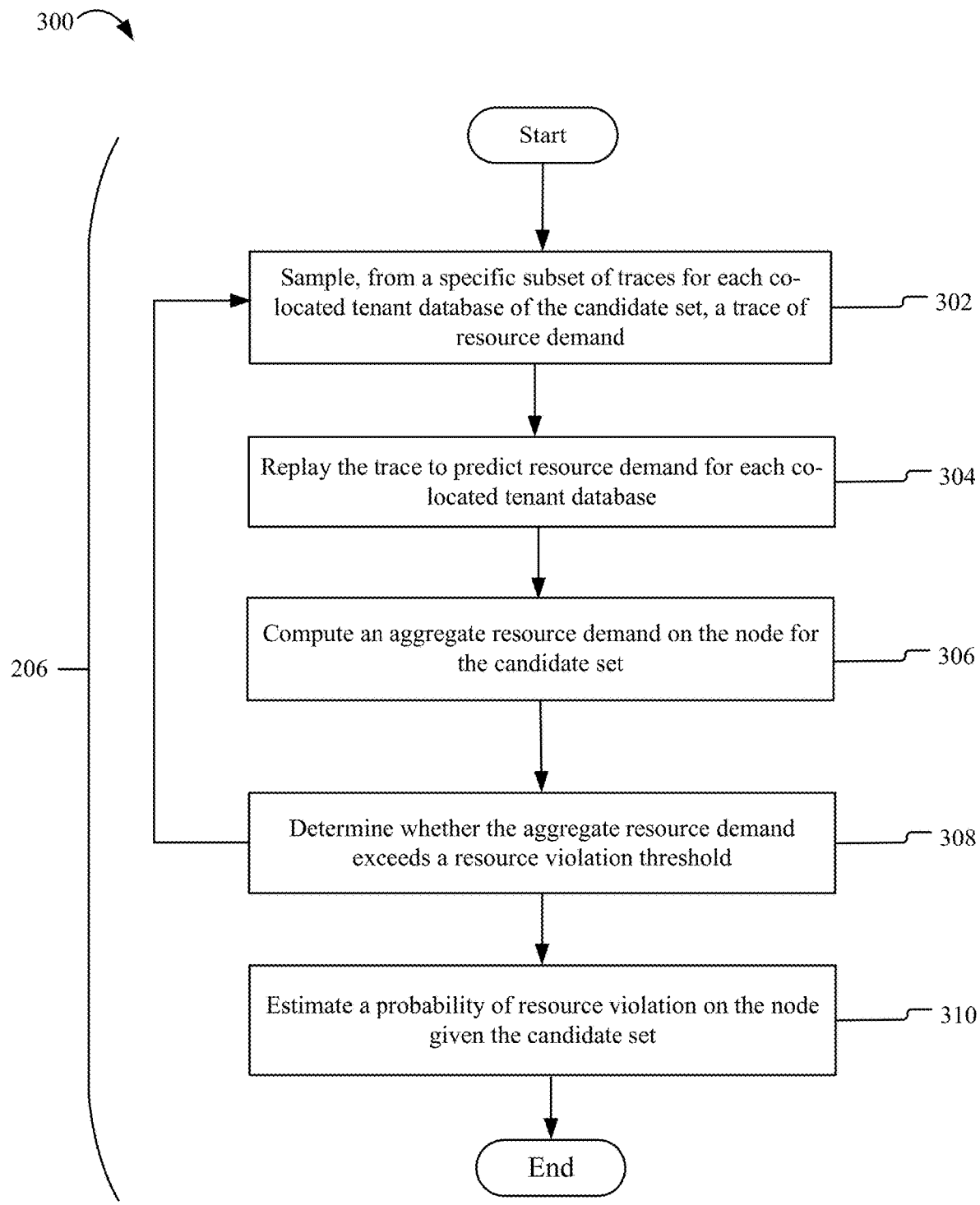
FIG. 3 illustrates an example method for estimating a probability of resource violation for a candidate set of tenant databases co-located on a node.

FIG. 3 illustrates an example method 300 for estimating a probability of resource violation for a candidate set of tenant databases co-located on a node. The method 300 may be provided by one or more components of the system 100 described in FIG. 1, including at least the cluster manager 122 of the service 102. The method 300 may be used at least in part to perform operation 206 of method 200 described with reference to FIG. 2 to estimate the probability of resource violation for the candidate set of tenant databases co-located on the node.

The method 300 begins at operation 302, where a trace of resource demand is sampled from a specific subset of traces for each co-located tenant database on the node. As previously discussed with reference to FIG. 2, for storage, the collected traces of resource demand may be grouped into subsets based on characteristics of the tenant databases with which the traces are associated. For example, for each tenant class, the library 128 may include a subset of traces associated with tenant databases of that tenant class. Each of the traces within the tenant class-specific subsets can further be filtered or broken down based on other tenant database characteristics, such as lifetime or resource usage.

Therefore, returning to operation 302, the specific subset of traces from which the trace is sampled for each co-located tenant database may be a subset of traces associated with tenant databases having one or more shared characteristics with the respective co-located tenant database. The phrase "shared characteristics" as defined herein is not limited to describing characteristics that are identical between tenant databases. Instead, shared characteristics may also include characteristics that are similar among tenant databases, e.g., based on bounds or constraints. For example, in addition to tenant class being one example shared characteristic between tenant databases that is identical, other shared characteristics can include a lower bounds of tenant lifetime (e.g., tenant databases having a lifetime of at least L units rather than a same or identical lifetime equal to L units) and a past resource demand meeting a particular value (e.g., tenant databases having a past demand for one or more resources that meet or exceed a particular value rather than an identical past demand equal to a same specific value).

The types of shared characteristics used to determine which subset of traces to sample from may be dependent on a type of the co-located tenant database. For example, if the co-located tenant database is the incoming database and is new, the only characteristic known may be tenant class and thus a trace may be randomly sampled from the specific subset of traces for that tenant class. If the co-located tenant database is the incoming database but is an existing database being moved from a different node within the cluster, or if the co-located tenant database is an existing database that is already hosted on the node within the cluster, additional characteristics of the existing database observed over a period of time may be used to further limit the traces within the tenant class-specific subset that can be sampled from. These additional characteristics may include dynamic characteristics, such as a lifetime (e.g., a time period at least as long as that observed period of time) and maximum resource demand based on actual resource demand observed from the existing tenant database over the period of time. As an illustrative example, if one of the co-located tenant databases is an existing database of a first tenant class that has existed on the cluster for a day, the trace may be sampled from a first tenant class-specific subset of traces that is further filtered to only include traces of resource demand associated with tenant databases having a lifetime of one day or longer.

At operation 304, the trace of resource demand may be replayed to predict resource demand for each co-located tenant database. In some examples, resource demand for all resource types (e.g., a demand for each of disk space, CPU usage, and memory) may be replayed in parallel, which captures correlation across the resource types. In further examples and as discussed in more detail in FIG. 5, the traces may be compressed traces to reduce the computational processing costs of the replay, in addition to conserving storage space.

At operation 306, an aggregate resource demand for the candidate set on the node may be computed based on the predicted resource demand for each co-located tenant database of the candidate set determined at operation 304. At operation 308, a determination of whether the aggregate tenant resource demand exceeds a resource violation threshold (and thus would result in a resource violation triggering failover), may be made.

Operations 302, 304, 306 and 308 may be performed iteratively to repeatedly sample and replay select traces for the given candidate set of co-located tenant databases, aggregate the resource demand for the candidate set on the node, and determine whether that aggregate resource demand exceeds the resource violation threshold. Each iteration of operations 302, 304, 306, and 308 may represent a single simulation of a plurality of Monte Carlo simulations that may be performed to estimate the probability of resource violation.

At operation 310, a probability of resource violation given the candidate set of co-located tenant databases on the node may be estimated. In some examples, the probability is a percentage of the simulations that resulted in a resource violation (e.g., a percentage of the simulations where the aggregate resource demand exceeded a resource violation threshold). Example equations that may be implemented at operation 310 for estimating the probability of resource violation ($Pr_{violation}$) given the candidate set (S) of co-located tenant databases on the node, and associated notations describing the components of the equation are described below.

The node of the cluster may offer a set of resources, $\mathcal{R} = \{r_1, \ldots, r_p\}$, including local memory, CPU, and disk space, for example. For each resource, r, the node has a capacity, $c_r$. The node may be in violation with regards to a resource (e.g., a resource violation may occur) if the aggregate demand on the node is larger than a threshold, T, that may be defined in terms of the node's capacity as $T = f \cdot c_r$, where $0 < f \leq 1$.

The aggregate demand on the node may be a function of the tenant demand for a set of databases placed on the node. For example, a total resource demand on a node, $N_i$, for a resource may be denoted as $node\_load_i^r$. To characterize changes of load on a node over time, the demand on a node may be associated with a time, $t \in \mathcal{T}$, denoted as $node\_load_{i,t}^r$. In some examples, time may be divided into discrete intervals (e.g., 1 minute), and the time "now" may be used to specify the current load on the node.

The candidate set of database tenants co-located on a node may be denoted as a set of database tenants, $\mathcal{DB}$. Each database of the set, $db \in \mathcal{DB}$ has a lifetime denoted by lifetime (db), which represents a time between when the database was initially placed on the cluster, denoted as creation_time (db), and when the database is removed or departs from the cluster. A demand for a tenant on a node may be denoted by $tenant\_load_{db,\delta}^r$, where the value $\delta$ is relative to the tenant database's creation time. For example, $tenant\_load_{db,\delta}^r$ corresponds to the resource demand for a tenant database observed at time t, where $t = creation\_time(db) + \delta$. A sequence of a tenant's resource demands for a specific resource may also be referred to as the tenant's demand curve, which may be expressed as follows:

$$tenant_{load_{db,0}}^r, \ldots, tenant_{load_{db,lifetime(db)}}^r.$$

Therefore, for a set of tenant databases placed on a node at time t (denoted as tenants ($N_i$,t)), $node\_load_i^r$ may be specified as a function of the tenant demand:

$$node\_load_{i,t}^r := \Sigma_{db \in tenants(N_i,t)} tenant\_load_{db,t-creation\_time(db)}^r.$$

The plurality of traces of resource demand (e.g., the resource demand curves) collected and stored for use in estimating probability of resource violations may be represented by $\mathcal{D} = \{demand_1, \ldots, demand_k\}$, where each element, $demand_i$, encodes a sequence of resource demands for all resources, $r \in \mathcal{R}$, over the lifetime of the tenant databases with which the traces are associated. The demand for resource, r, at time point, $\delta$, for a co-located tenant database is denoted as $demand_{i,\delta}^r$, where $\delta$ refers to a time offset relative to when the respective co-located tenant database has been placed (e.g., a time period since the database was initially placed on the cluster at creation_time ($db_j$)).

Assuming that incoming databases have traces (e.g., demand curves) sampled at random from $\mathcal{D}$, and a candidate set of tenant databases, $S = \{db_1, \ldots db_t\}$, is placed on a node (where tenant database $db_j$ is placed at creation_time ($db_j$)), then the estimated distribution of node load for a resource r at time t becomes:

$$\{\Sigma_{j=1}^t demand_{o_j,t-creation\_time(db_j)}^r : o_1 \in [|\mathcal{D}|], \ldots, o_t \in [|\mathcal{D}|]\},$$

where $o_j$ represents an offset of the trace used to simulate $db_j$ when the traces sampled at random from $\mathcal{D}$ are further refined to account for additional constraints.

Therefore, the probability of a resource violation may be expressed in equation (1) as follows:

$$Pr_{violation}(S) = \frac{|\{(o_1, \ldots, o_{|S|}) \in [|\mathcal{D}|] \times \ldots \times [|\mathcal{D}|] \mid (o_1, \ldots, o_{|S|}) \text{ results in violation}\}|}{|\mathcal{D}|^{|S|}} = \frac{\left|\{(o_1, \ldots, o_{|S|}) \in [|\mathcal{D}|] \times \ldots \times [|\mathcal{D}|] \mid \exists r \in \mathcal{R}, \delta \in \mathcal{T}: \left(\sum_{j=1}^{|S|} demand_{o_j,t-creation\_time(db_j)}^r\right) \geq f \cdot c_r\}\right|}{|\mathcal{D}|^{|S|}}. \quad (1)$$

However, if at least one of the co-located databases in the candidate set S is an existing database, equation (1) does not account for how to more accurately model the uncertainty in the demand of the existing tenant database based on additional information known from observations of the existing tenant database over time. For example, for existing tenant databases, at least a portion of the trace of resource demands associated with the tenant database has already been observed, thereby narrowing the set of possible (future) demand curves for them and thus further limiting the traces (e.g., demand curves) that can be sampled at random from $\mathcal{D}$. Suitable subsets of $\mathcal{D}$ that can be sampled from may be represented as $[|\mathcal{D}|]$ (with each element being characterized as an ID). As one illustrative example, if an existing tenant database was placed into a cluster L units of time earlier (e.g., the existing tenant database has a lifetime of at least L units) this may be included as a constraint to sample from only demand elements of $\mathcal{D}$ having a lifetime of at least L units. Similarly, resource usage observed for existing tenant databases is accounted for when selecting elements of $\mathcal{D}$ to sample at random from. This enables more accurate estimates of resource load and the probability of violation to be obtained, as the different properties of the traces may be correlated. For example, longer-lived tenant databases are more likely to have a higher maximum resource demand.

For this purpose, the notation $\mathcal{D}_{\{P\}}$ may be used for a predicate, P, to specify the subset of all members of $\mathcal{D}$ that satisfy the predicate, e.g., $\mathcal{D}_{\{lifetime(db) > lt\}}$. Therefore, equation (1) may be modified such that all members of $\mathcal{D}$ are no longer sampled from. Instead, for each tenant $db_j$, a set of constraints, constraints($db_j$), may be formulated, and only the $\mathcal{D}_{constraints(t_j)}$ may be sampled from. As one illustrative example, for an existing tenant database already placed on the cluster, a lower bounds on the lifetime L of the existing tenant database as well as a maximum demand for each resource $\mathcal{D}_r$ of the existing tenant database observed thus far may be known, and thus the constraints may be formulated for the existing tenant database accordingly. For example, sampling occurs only from a subset of traces associated with tenant databases of a same tenant class as the existing tenant database, and whose lifetime is at least L and for which the observed demand for each resource r is at least $\mathcal{D}_r$ at some point during the trace.

Therefore, equation (1) may be modified as described above to yield equation (2) shown below in order to more accurately estimate a probability of resource violation on the node given the candidate set S of tenant databases co-located on the node.

$$Pr_{violation}(S) = \frac{\left|\{(o_1, \ldots, o_{|S|}) \in [|\mathcal{D}_{constraints(t_1)}|] \times \ldots \times [|\mathcal{D}_{constraints(t_h)}|] \mid \exists r \in \mathcal{R}, \delta \in \mathcal{T}: \left(\sum_{j=1}^{|S|} demand^r_{o_j, t-creation\_time(db_j)}\right) \geq f \cdot c_r\}\right|}{|\mathcal{D}_{constraints(t_1)} \times \ldots \times \mathcal{D}_{constraints(t_h)}|}. \quad (2)$$

Figure 4:
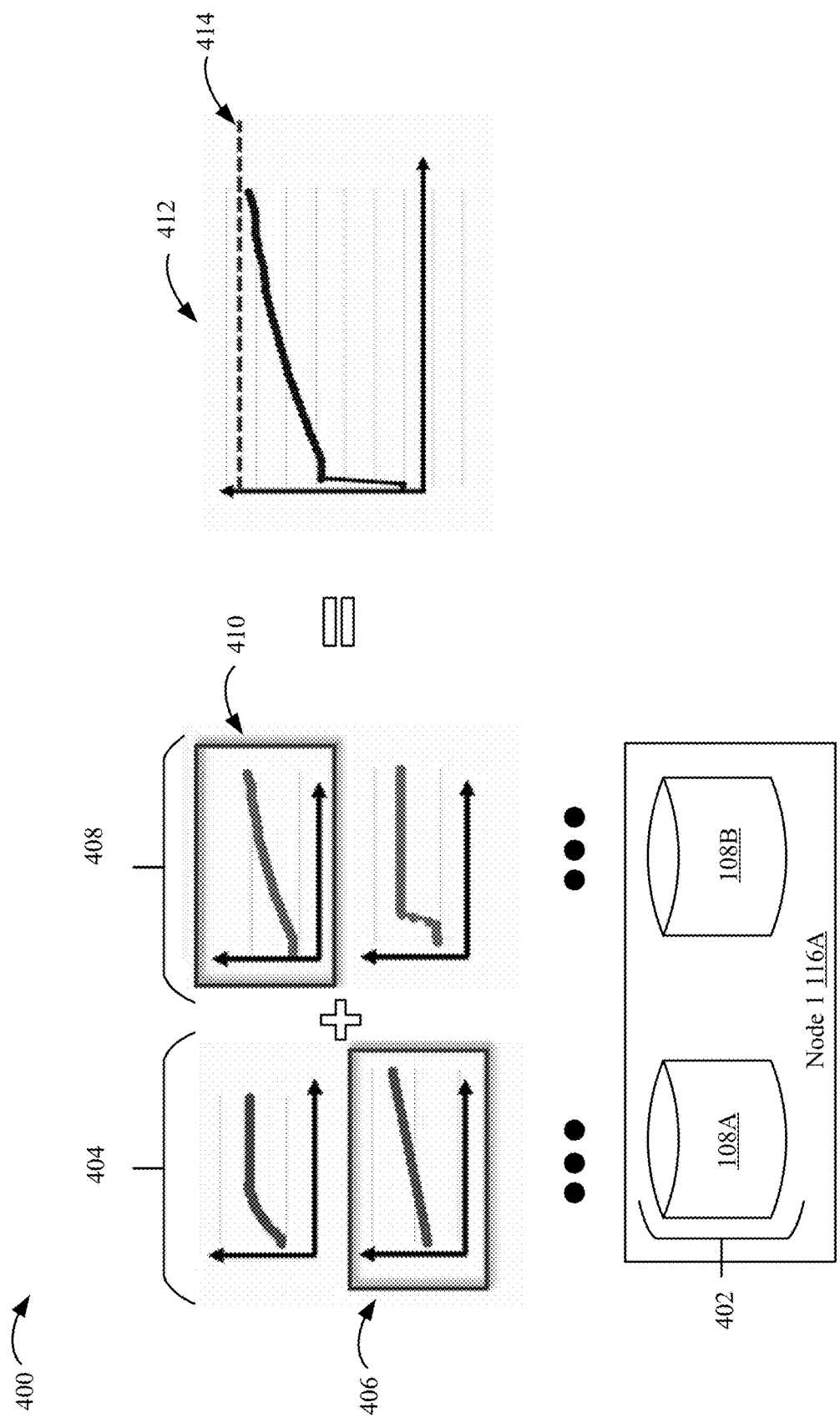
FIG. 4 conceptually illustrates estimating a probability of resource violation for a candidate set of tenant databases co-located on a node.

FIG. 4 is a diagram 400 conceptually illustrating estimation of a probability of resource violation for a given candidate set of tenant databases co-located on a node, such as candidate set 402 co-located on the first node 116A. As shown in diagram 400, the candidate set 402 may include the first tenant database 108A of the first tenant 106A and the second tenant database 108B of the second tenant 106B. In this example, the first tenant database 108A may be an incoming database to be placed within the first cluster 114A and the second tenant database 108B may be an existing tenant database already placed and hosted on the first node 116A of the first cluster 114A. The first tenant 106A may be of a first tenant class and the second tenant 106B may be of a second tenant class.

The probability of resource violation for the candidate set 402 may be estimated using a method similar to the method 300 described with reference to FIG. 3. For example, within a first simulation, for the first tenant database 108A, a first demand curve 406 is randomly chosen from a first subset of demand curves 404 specific to the first tenant class. For the second tenant database 108B, a second demand curve 410 is randomly chosen from a second subset of demand curves 408 specific to the second tenant class. Because the second tenant database 108B is an existing tenant database already placed and hosted on the first node 116A, the second subset of demand curves 408 from which the second demand curve 410 is sampled may be further limited by one or more constraints based on observed lifetime of the second tenant database 108B and/or the past resource demand of the second tenant database 108B, for example.

An aggregate demand curve 412 representing the aggregate resource demand for the candidate set 402 on the first node 116A may result from a summation of the first demand curve 406 and the second demand curve 410. The aggregate demand curve 412 may then be utilized to determine whether the aggregate resource demand, at any point, exceeds a resource violation threshold 414. As illustrated in this example, the resource violation threshold is not exceeded for this simulation.

The above-described random sampling, aggregation, and resource violation check may be repeated to run a plurality of simulations. Once the plurality of simulations are run, a probability of resource violation given the candidate set 402 of tenant databases co-located on the first node 116A may be estimated based on a fraction or percentage of times a resource violation was observed in the simulations.

FIG. 5 is a diagram 500 conceptually illustrating the efficacy of compressed traces of resource demand when used in probability of resource violation estimates. As discussed in greater detail above with reference to FIGS. 3 and 4, as part of the Monte Carlo simulations performed to estimate probability of resource violations, traces of resources demand may be repeatedly sampled and replayed. The traces may be large in size, containing a potentially large number of data points dependent on the lifetime of the tenant database with which the trace is associated. Thus, replaying these sampled traces of resource demand step by step is computationally expensive. Additionally, the traces may consume a large amount of storage space. However, the traces may be compressed, without significantly affecting the resulting probability of resource violation estimates, to reduce the computational overhead and conserve storage space.

For example, a compressed trace of resource demand may be a compact model of a respective tenant database's demand for each resource characterized using a small and constant number of parameters. A description of the modeling of each resource (e.g., local memory, disk space, and CPU) is described in greater detail below. Once compressed, the trace requires multiple orders of magnitude of less space for storage. Also, monotonic properties of the compressed traces may be leveraged, such that a lesser number of time points are evaluated when computing the probability of resource violation. For example, rather than evaluating the sum of tenant database resource demands for all relevant time points, $\delta \in \mathcal{T}$, for a given set of samples from $\mathcal{D}$, the aggregate resource demand for only h elements of $\mathcal{T}$ may be computed, where h corresponds to a number of the tenant databases co-located on the node. As an illustrative example, if h tenant databases are co-located on a node, it can be shown that only h time points across the trace need to be evaluated for a resource violation per simulation. If there is at least one resource violation determined among the h time points (e.g., an aggregate resource demand predicted for the h tenant databases exceeds the resource violation threshold), then a resource violation exists for the simulation. If no resource violation is detected among the h time points, it can be assumed that even if all time points across the trace had been evaluated, a resource violation would not have been detected.

Moreover, as illustrated by graph 502 within diagram 500, compression of the traces does not significantly affect the probability of resource violation estimates. For example, in graph 502, the x-axis 504 represents a probability of resource violation estimation for co-located tenant databases on a node performed using full traces and the y-axis represents a probability of resource violation estimation for the same co-located tenants on the node performed using a compact representation of the same historical traces (e.g., using compressed traces). There is almost an exact correspondence between the estimates with only a slight variance as the number of co-located tenant databases increase. Therefore, the computational resources and storage conserved by using the compressed traces outweighs the slight variance of candidate sets with higher numbers of co-located tenant databases that may be given up by using the compressed traces instead of the full traces.

As previously discussed, a compressed trace of resource demand may be a compact model of a respective tenant database's demand for each resource (e.g., for each of disk space, local memory, and CPU). The models may be generated based on observations regarding typical shapes of demand curves for the resources. For example, with respect to disk space, most tenant databases grow to their maximum disk demand and subsequently retain a disk demand close to this maximum level. Based on these observations, disk demand may be modeled using at least the following three parameters. A first parameter, $G_{disk}$, may be a duration of the growth phase. A second parameter, $M_{disk}$, may be a maximal disk demand to which the tenant database grows. A third parameter, $I_{disk}$, may be an initial disk demand first reported for the tenant database. The first, second and third parameters may be chosen individually for each trace in the plurality of traces (e.g., represented by $\mathcal{D}$) in this compressed form. Based on the first, second, and third parameters, the disk demand of a tenant database db at a time-point $\delta$ may be modeled as:

$$demand_{db,\delta}^{disk} = \begin{cases} I_{disk}^r + \dfrac{\delta}{G_{disk}} \cdot M_{disk}, & \delta \le G_{disk} \\ M_{disk}, & \text{otherwise} \end{cases}.$$

The above model may preserve a correlation in disk demand across time intervals for a given tenant database (e.g., a tenant database with a relatively high load at a time t will continue to have a high load at time t+$\delta$). This correlation corresponds to the real-world behavior of tenant databases, and reduces a likelihood of overestimating the probability of resource violation.

With respect to memory, memory demand follows a similar overall pattern as disk demand. For example, most tenant databases grow to their maximum memory demand and subsequently retain a memory demand close to this maximum level. Accordingly, memory demand may be modeled similarly to disk demand using at least the following three parameters. A first parameter, $G_{mem}$, may be a duration of the growth phase of the tenant database. A second parameter, $M_{mem}$, may be a maximal memory demand to which the tenant database grows. A third parameter, $I_{mem}$, may be an initial memory demand first reported for the tenant database. However, among memory and disk demand, distributions of these three parameters are considerably different. For example, tenant databases often reach 95% of their peak memory demand at a much later time than 95% of their disk demand.

With respect to CPU, CPU demand, unlike memory and disk demand, typically does not follow a simple pattern, but changes rapidly and, in many cases, unpredictably. As a result, rather than modelling any long-term trends for CPU, the 95th percentile of the observed CPU usage, $U95_{cpu}$, may be retained and used when estimating probability of resource violations. In addition to the compressed representation (e.g., the compact models) of each of the resource demands, a lifetime L of the tenant database may be retained.

Resultantly, using the above-described models, a trace of resource demand for a single tenant database may be represented using 8 parameters: $M_{disk}$, $G_{disk}$, $I_{disk}$, $M_{mem}$, $G_{mem}$, $I_{mem}$, $U95_{cpu}$ and L, resulting in a set of 8-tuples when compressed. Each of the 8-tuples may be tagged with additional metadata, such as a tenant class of the tenant database.

Figure 6:
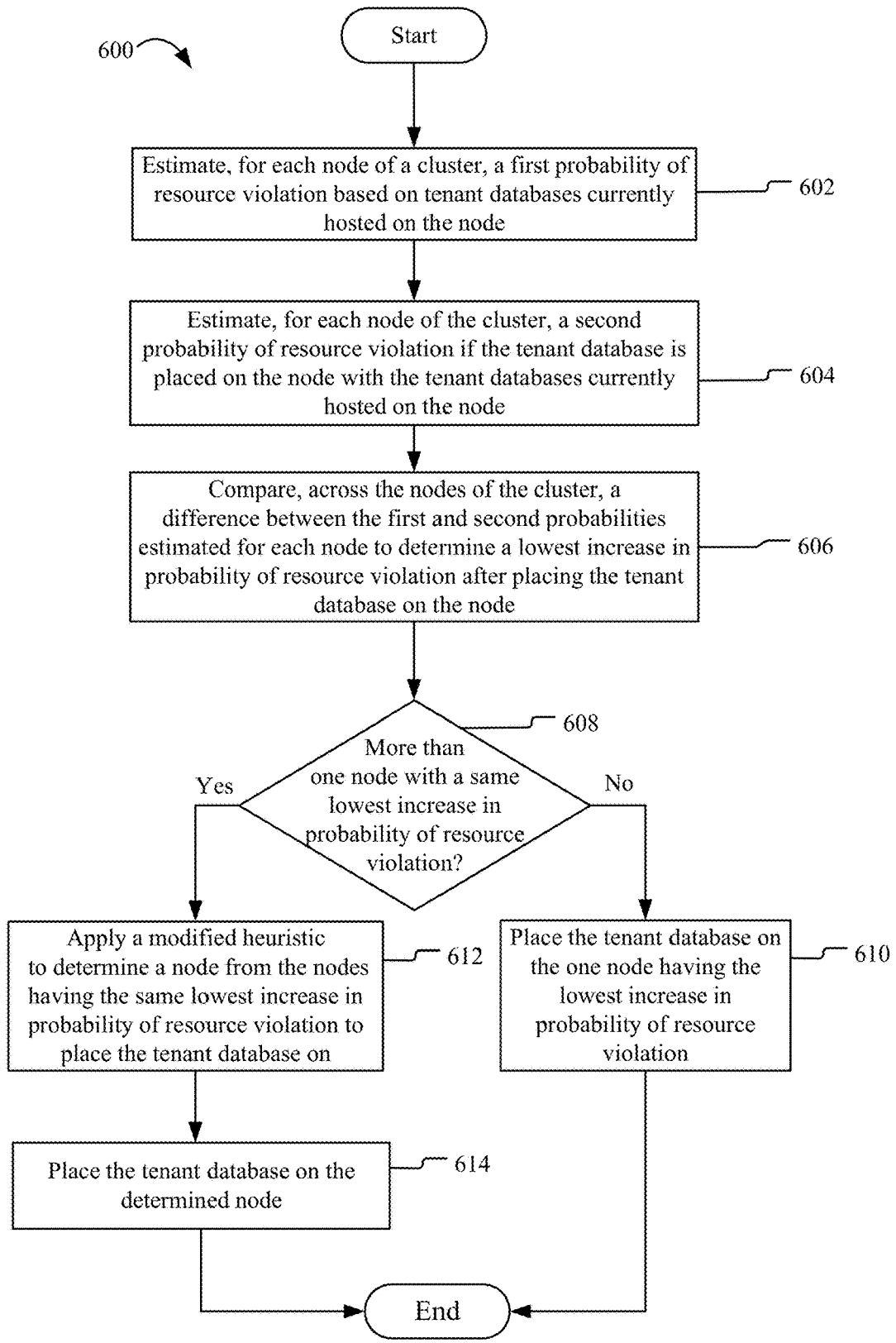
FIG. 6 illustrates one example method for placing a tenant database within an oversubscribed cluster based on probability of resource violation estimates.

FIG. 6 illustrates an example method 600 for placing a tenant database within an oversubscribed cluster based on probability of resource violation estimates. The method 600 may be provided by one or more components of the system 100 described in FIG. 1, including at least the cluster manager 122 of the service 102. In some examples, the method 600 may be performed when a single tenant database is being placed or moved at a time. In other words, when the tenant databases are being placed sequentially on a one-by-one basis.

The method 600 begins at operation 602, where a first probability of resource violation may be estimated for each node of a cluster based on tenant databases (if any) currently hosted on the node. In other words, the first probability of resource violations estimated for the nodes of the cluster may provide a per-node baseline for the current configuration of the cluster (e.g., before placement of the tenant database to be placed). The first probability of resource violation may be estimated as described above in detail with reference to FIG. 3, where the set of co-located tenants for each node may simply be the tenant databases currently hosted on the node, if any.

At operation 604, for each node of the cluster, a second probability of resource violation if the tenant database is placed on the node with the tenant databases (if any) currently hosted on the node may be estimated. The second probability of resource violation may be estimated as described above in detail with reference to FIG. 3, where the set of co-located tenants for each node may be the tenant database being placed and the other tenant databases currently hosted on the node, if any.

At operation 606, a comparison of a difference between the first and second probability of resource violations estimated for each node may be performed across the nodes of the cluster to determine a lowest increase in probability of resource violation after placing the tenant database on the node. As one illustrative, non-limiting example, the difference for one or more nodes may be zero indicating that the probability of resource violation on the node is not affected or increased by placing the tenant database on the node, and these one or more nodes with a difference of zero may be determined to have the lowest increase in probability of resource violation.

Based on the comparison at operation 606, a determination is made at decision 608 as to whether more than one node of the cluster has the same lowest increase in probability of resource violation after placing the tenant database on the node. If at decision 608, a determination is made that only one node has the lowest increase in probability of resource violation after placing the tenant database on the node, the method 600 proceeds to operation 610. At operation 610, the tenant database may be placed on the one node having the lowest increase in probability of resource violation.

Otherwise, if at decision 608, a determination is made that more than one node has the same lowest increase in probability of resource violation after placing the tenant database on the node, the method 600 proceeds to operation 612. Such a determination may be common if the cluster includes multiple nodes that are not oversubscribed after placing the tenant database on the nodes, as the probability of resource violation may be zero for each of the multiple nodes. At operation 612, a modified heuristic may be applied to determine a node from the multiple nodes having the same lowest increase in probability of resource violation to place the tenant database on. The modified heuristic may be an existing heuristic, such as best-fit or worst-fit, that is modified to include the second probability of resource violation estimations determined at operation 604. Illustrative examples of different types of modified heuristics that may be applied are shown in FIGS. 7 and 8. At operation 614, the tenant database may be placed on the node determined by application of the modified heuristic.

One challenge when extending heuristics, such as best-fit or worst-fit, to a vector of resource demands on a node (e.g., $node\_load_i := (node\_load_i^{r_1}, \ldots, node\_load_i^{r_v}))$ may be combining the resources used on the node into a single value, to which the heuristic may then be applied. To alleviate this challenge, weighting functions may be utilized for each of the resources. A first example weighting function that may be utilized is an FFDSum heuristic that is defined as:

$$W_{Sum}(\text{node\_load}_i) = \sum_{i=1,\ldots,v} \frac{w_i}{c_{r_i}} \text{node\_load}_i^{r_i},$$

where $$w_i = \frac{1}{|\mathcal{DB}|} \sum_{db \in \mathcal{DB}} \text{tenant\_load}_{db,now}^{r_i}.$$

The first example weighting function may assign a weight to each resource that corresponds to the aggregate resource demand within the entire cluster, and then sums the weighted demands on each node. A second example weighting function that may be utilized is defined as:

$$W_{Max}(\text{node\_load}_i) = \max_{i=1,\ldots,v} \frac{\text{node\_load}_i^{r_i}}{c_{r_i}}.$$

This second example weighting function may use the maximum demand (relative to node capacity for the resource) across all resources. Both the first and second example weighting functions result in a normalized value between 0 and 1. In the algorithms shown in FIGS. 7 and 8, the notation W( ) is used for the weighting function, where each of the algorithms may be instantiated with a different weighting function.

FIG. 7 illustrates one example algorithm 700 based on a modified heuristic. As described in detail with reference to method 600 of FIG. 6, in some examples, the modified algorithm 700 may be applied when multiple nodes of a cluster have a same lowest increase in the probability of resource violations in order to make a determination of which of those nodes to ultimately place the tenant database on (e.g., see operations 612 and 614 of method 600). The modified algorithm 700 may be based on a best-fit heuristic that places a tenant database on a node of the cluster that has the smallest amount of resource capacity remaining after the tenant database has been placed.

Application of a best-fit heuristic "as is" may result in highly dense packings, where all tenant databases are concentrated on a lesser number of nodes within the cluster. Highly dense packings may minimize resource fragmentation (e.g., resulting from highly variable resource usage among different tenant classes). However, highly dense packings may also potentially increase a number of resource violations on the densely populated nodes. Therefore, the modified algorithm 700 may be based on a best-fit heuristic that is modified to leverage or include probability of resource violation estimates in order to exclude nodes that are packed too densely as destinations for the tenant to be placed. In other words, the modified algorithm 700 prevents placement of the tenant database on a node if it would cause the probability of violation on that node to exceed a threshold value, $\theta$.

In a scenario where all nodes have a probability of violation exceeding the threshold value, the tenant database may be placed such that the expected number of resource violations over the entire cluster is minimized. The expected number of resource violations is defined as the sum of the probability of violation over each node based on an assumption that resource demands are independent across nodes. This assumption holds true between a vast majority of pairs of tenants, with the only exception being different replicas of the same tenant located on different nodes within the same cluster.

FIG. 8 illustrates another example modified algorithm 800. As described in detail with reference to method 600 of FIG. 6, in some examples, the modified algorithm 800 may be applied when multiple nodes of a cluster have a same lowest increase in probability of violation in order to make a determination of which of those nodes to ultimately place the tenant database on (e.g., see operations 612 and 614 of method 600). The modified algorithm 800 may be based on a worst-fit heuristic that places a tenant database on a node of the cluster that has the largest amount of resource capacity remaining after the tenant database has been placed.

Application of a worst-fit heuristic "as is" may result in tenants being spread across the cluster, which typically leads to fewer resource violations than application of a best-fit heuristic discussed above with reference to FIG. 8. However, the tenants being spread across the cluster may cause issues with regard to resource fragmentation. To provide an illustrative example of resource fragmentation, a cluster of M nodes may host tenant databases associated with two different tenant classes. A first tenant class may be more common and consume about 25% of a node's capacity for all resources. A second tenant class may be rare and consume about 80% of a node's capacity for all resources. In the cluster of M nodes, if at least M tenant databases of the first tenant class have been placed using a Worst-Fit heuristic, then at least one of the M tenant databases of the first tenant class are placed on each node. Resultantly any incoming tenant database of the second tenant class will trigger a resource violation (e.g., will exceed the node's capacity).

Therefore, to remedy these potential resource fragmentation issues, the modified algorithm 800 may be based on a worst-fit heuristic that is modified to strategically hold out a set of nodes within the cluster, such that tenant database placement on these held out nodes may only be allowed if the estimated probability of violation is larger than the threshold value, $\theta$, when placing the tenant database on any of the other non-held out nodes. The set of held out nodes may be determined dynamically as the M least loaded nodes in the cluster at the time of placement, where a weighting function may be used to combine multiple resource types into a single measure of load.

In a scenario where placing the tenant database on any node results in an estimated probability of violation exceeding the threshold, the tenant database may be placed such that the expected number of resource violations (e.g., the sum of the probability of violation over each node) is minimized over the entire cluster.

Figure 9:
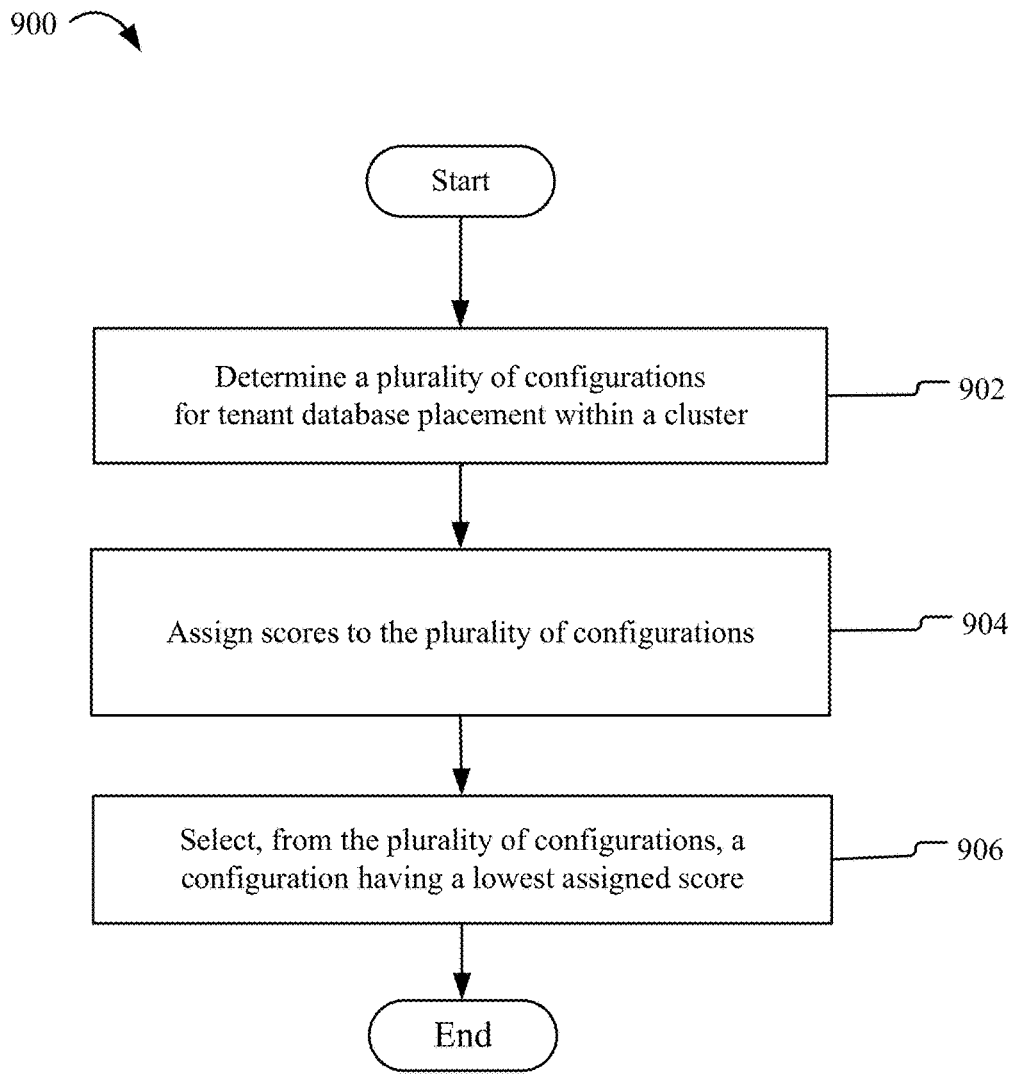
FIG. 9 illustrates another example method for placing a tenant database within an oversubscribed cluster based on probability of resource violation estimates.

FIG. 9 illustrates an example method 900 for placing a tenant within an oversubscribed cluster based on probability of resource violation estimates. The method 900 may be provided by one or more components of the system 100 described in FIG. 1, including at least the cluster manager 122 of the service 102. In some examples, the method 900 may be performed when multiple tenant databases are being placed or moved at a same time within a cluster. In other words, when the multiple tenant databases are being placed in parallel.

The method 900 begins at operation 902, where a plurality of configurations for tenant database placement within a cluster may be determined. In some examples, a number of possible configurations may be limited to valid configurations that do not violate pre-defined constraints of how tenants must be placed within a cluster.

At operation 904, scores may be assigned to the plurality of tenant placement configurations. As discussed in more detail with reference to FIG. 10 below, in some examples, at least operations 902 and 904 may be performed in an enumerated manner using a central loop based on simulated annealing. For example, when exploring the possible configurations for placement within the cluster, a random move may be generated (e.g., a move of a tenant database to a different node of the cluster) and a score for the resulting configuration post-move may be computed. Depending on the score difference to the previous configuration (e.g., pre-move), the resulting configuration may be adopted with a certain probability and used as the basis for further exploration. This process may continue until either a timeout expires or the values of the scores sufficiently converge. Additionally, the scores may be assigned using a scoring function implemented by the placement component 124 of the cluster manager 122, for example, that is modified to leverage the probability of resource violation estimates. A method for assigning a score to a configuration using the modified scoring function is described in detail with reference to FIG. 11 below.

At operation 906, a configuration having a lowest assigned score may be selected. One or more tenant databases may then be moved within the cluster to realize the selected configuration.

Figure 10:
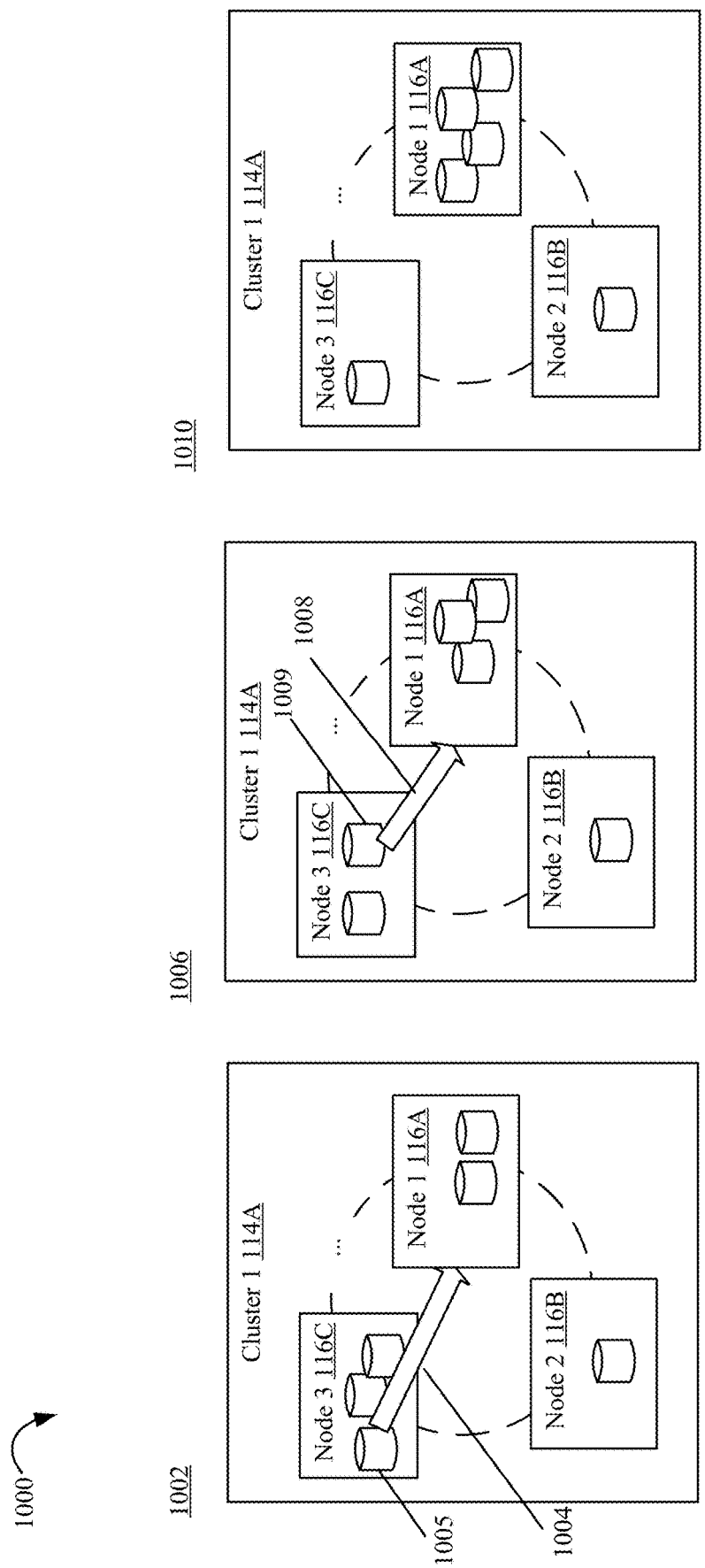
FIG. 10 is a diagram conceptually illustrating enumeration of configurations for parallel tenant database placement.

FIG. 10 is a diagram 1000 conceptually illustrating enumeration of tenant placement configurations. In this illustrative example, within a current configuration 1002 of tenant database placement on nodes 116 of the first cluster 114A, a resource violation may be present on the third node 116C. The presence of the resource violation may trigger a failover during which one or more tenant databases on the third node 116C may be moved to one or more other nodes of the first cluster 114A to resolve the resource violation.

As discussed with reference to operation 902 of method 900 of FIG. 9, as part of the placement process, a plurality of configurations may be determined. Specifically, in at least some examples, the placement component 124 may enumerate a space of all possible, valid tenant placement configurations. Validity of a configuration may be based on constraints of how tenants have to be placed. Example constraints include minimum replica counts, affinity constraints, having no more than one replica per failure domain, or co-location requirements for different services, among other examples. For example, the placement component 124 may initiate the enumeration at the current configuration 1002 and generate a first random move 1004 to result in a second configuration 1006. For example, the first random move 1004 may remove a first random tenant database 1005 from the third node 116C where the resource violation is present and choose a random other node, such as the first node 116A to place the first random tenant database 1005 on. A score for the second configuration 1006 may then be computed and assigned to the second configuration 1006. As discussed with reference to operation 904 of method 900 of FIG. 9, and as described in greater detail with reference to FIG. 11, the score may be assigned using a modified scoring function that integrates probability of resource violation estimates.

If the score for the second configuration 1006 is lower than a score having been previously assigned to current configuration 1002, the second configuration 1006 may be selected as a basis for further exploration, as illustrated in diagram 1000. For example, continuing with the second configuration 1006, a next random move 1008 may remove a second random tenant database 1009 from the third node 116C where the resource violation is present and choose a random other node, such as the first node 116A to place the second random tenant database 1009 on, resulting in a third configuration 1010 for which a score is computed.

Otherwise, had the score for the second configuration 1006 not been lower than the lowest score having been previously assigned, the placement component 124 may alternatively return to the current configuration 1002, generate a different random move from the first random move 1004 to result in another configuration for which a score is computed. Based on the score, a determination of whether to use this other configuration as the basis for further exploration or instead return to the current configuration 1002 is made. As long as the computed scores for the various configurations are not falling below the lowest score, this process may be continuously repeated until either a timeout is expired or there is convergence in the scores (e.g., if a configuration does not fall below the lowest score results, the configuration may still be accepted with lower probability in the beginning and, as time goes by, that probability may become smaller and smaller so that the process likely converges). Simulated annealing is an example technique used to perform this process.

Figure 11:
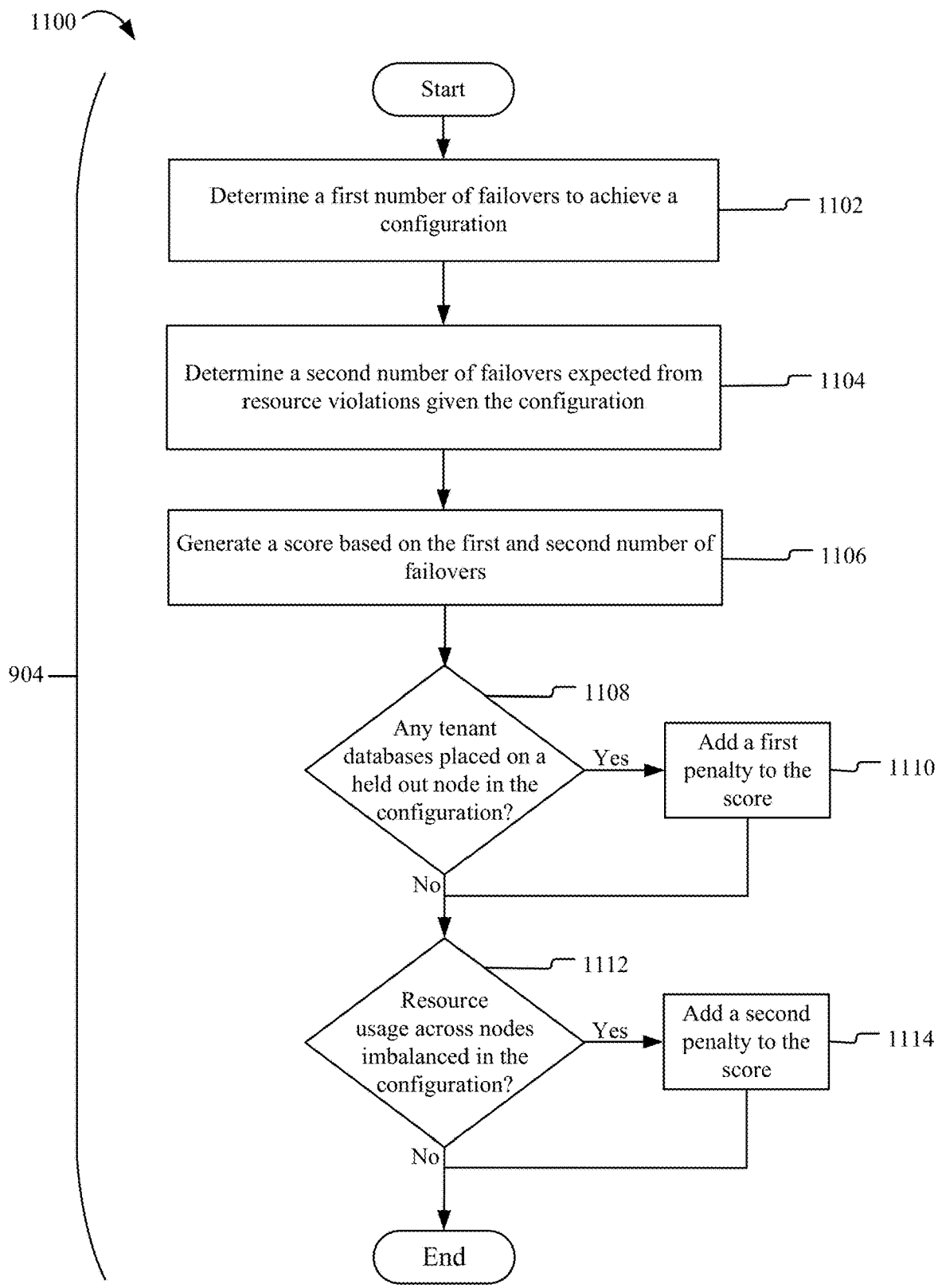
FIG. 11 illustrates an example method for assigning a score to a configuration.

FIG. 11 illustrates an example method 1100 for assigning a score to a configuration. The method 1100 may be provided by one or more components of the system 100 described in FIG. 1, including the placement component 124 of the cluster manager 122. The method 1100 may be used at least in part to perform the method of method 904 described with reference to method 900 of FIG. 9.

In some examples, the score may be assigned using an original scoring function implemented by the placement component 124 that is then modified to leverage probability of resource violation estimations (e.g., determined using the method 300 of FIG. 3). For example, the original scoring function may include three components. A first component may be a number of failovers (e.g., a number of tenant databases that will be moved) to achieve the tenant placement configuration from the current configuration. A second component may be a penalty that serves to negatively impact the score when, to achieve the configuration, one or more of the tenant databases being moved are placed on a held out node (e.g., a node that is intentionally left empty). A third component may be a penalty that also serves to negatively impact the score when the tenant placement configuration results in imbalanced resource usage among the nodes of the cluster (e.g., results in an imbalanced cluster), where this penalty may quantify how imbalanced resource demand is within a cluster using a weighted average of the standard deviation of resource demands across all nodes in the cluster. Method 1100 reflects a modified version of each of the components of the original scoring function that is implemented to assign the score.

The method 1100 begins at operation 1102, where a first number of failovers to achieve the configuration may be determined. The first number of failovers represents a number of tenant databases that will be moved from their current node to a different node within the cluster in order to conform to the configuration.

At operation 1104, a second number of failovers expected from resource violations may be determined. In other words, once the tenant databases are moved to conform to the configuration, the second number of failovers represents a potential number of failovers that may occur in the future due to resource violations. Based on the assumption that every resource violation can be solved using one failover, the second number of failovers is the sum over the probability of resource violation across all nodes of the cluster. The probability of resource violation estimates may be determined as described above with reference to method 300 of FIG. 3.

To further clarify, there may be different tenant databases on each node of a cluster that are assumed to be independent, and this is mostly true as many tenant databases have different tenants or customers behind them. If one tenant database's resource usage goes up, another tenant's will not necessarily do the same. Thus, the expected number of violations inside the entire cluster corresponds to the sum of the probability of the violation on each node within the cluster. Once the expected number of resource violations in the entire cluster is determined, and it is assumed that each resource violation can be can be solved using one failover, then the expected number of failovers is equal to the expected number of violations.

At operation 1106, a score may be generated based on the determined first number of failovers to achieve the configuration at operation 1102 and the determined second number of failovers expected from resource violations at operation 1104. In some examples, the score may be a summation of the first and second numbers of failovers. Resultantly, the score generated may be a summation of failovers required by movement of tenant databases to yield the configuration (known failovers) and the expected number of failovers (possible future failovers) as a result of this configuration.

At decision 1108, a determination is made as to whether, to achieve the configuration, any tenant databases are placed on a held out node. Held out nodes are one or more nodes of the cluster that are strategically left empty (e.g., that host no tenant databases). These held out nodes may be critical if tenants with large resource usage need to be moved quickly. Therefore, if at decision 1108, a determination is made that one or more tenant databases are moved to one or more of these held out nodes, the method 1100 may proceed to operation 1110.

At operation 1110, a first penalty (e.g., a fragmentation penalty) may be added to the score generated at operation 1106. The score may be negatively impacted by this added first penalty. For example, the score may be increased by a value of the first penalty. In one example, to determine the value of the first penalty, all held out nodes (e.g., M held out nodes) may sorted in descending order by their aggregate resource demand (e.g., using the $W_{Max}(\ )$ weighting function to combine the different resource demands into a single value as described above with reference to FIG. 6), where the i-th node in the sort order corresponds to the node ID, offset(i). The i-node may then be assigned a weight $$f_i = \frac{1}{i+1},$$

and an overall fragmentation penalty may be computed as follows:

$$\text{Frag\_Penalty} := \sum_{i=1}^{M} \frac{1}{i+1} W_{Max}(\text{node\_load}_{offset(i)}).$$

The method 1100 may then proceed to decision 1112. Alternatively, if at decision 1108, a determination is made that no tenant databases are moved to a held out node, then the method 1100 may instead proceed directly to the decision 1112.

At decision 1112, a determination is made as to whether resource usage across the nodes of the cluster is imbalanced in the configuration. If, at decision 1112, a determination is made that the resource usage across the nodes of the cluster is imbalanced in the configuration, the method 1100 proceeds to operation 1114. For example, resource usage may be determined to be imbalanced if, based on the configuration, a few nodes of the cluster host one or more tenant databases that at least in combination have high resource usage (e.g., these few nodes have limited resource capacity remaining), whereas a remaining majority of nodes host tenant databases with minimal resource usage or none at all.

At operation 1114, a second penalty (e.g., an imbalance penalty) may be added to the score generated at operation 1106. The score may be negatively impacted by this added second penalty. For example, the score may be increased by a value of the second penalty. In one example, to determine the value of the second penalty, all non-held out nodes (e.g., |Nodes|−M held out nodes) may be sorted in descending order by their aggregate resource demand (e.g., using the $W_{Max}(\ )$ weighting function to combine the different resource demands into a single value as described above with reference to FIG. 6), where the i-th node in the sort order corresponds to the node ID, offset(i). The i-node may then be assigned a weight $$f_i = \frac{1}{M+i+1},$$

and an overall imbalance penalty may be computed as follows:

$$\text{Imbalance\_Penalty} := \sum_{i=1}^{|Nodes|-M} \frac{1}{M+i+1} W_{Max}(\text{node\_load}_{offset(i)}).$$

The method 1100 may then end. Alternatively, if at decision 1112, the resource usage across the nodes of the cluster is balanced in the configuration, then the method 1100 may end.

Resultantly, in some examples, the score assigned to the configuration may be the score generated at 1106. In other examples, the score may be the score generated at 1106 with the first penalty added to increase the score. In further examples, the score may be the score generated at 1106 with the second penalty added to increase the score. In yet further examples, the score may be the score generated at 1106 with both the first penalty and the second penalty added to increase the score.

FIG. 12 is a block diagram illustrating physical components (e.g., hardware) of a computing device 1200 with which aspects of the disclosure may be practiced. For example, the computing device 1200 may illustrate components of processing devices or servers of the system 100, including the servers 103 of the service 102 and the computing device 111. The computing device components described below may be suitable for the computing devices and systems described above. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories.

The system memory 1204 may include an operating system 1205 and one or more program modules 1206 suitable for running software application 1220, such as the applications 112 run by the computing devices 122, as well as the one or more virtual machines and/or one or more components associated with the hosted services that are supported by the systems described herein. The operating system 1205, for example, may be suitable for controlling the operation of the computing device 1200.

Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, solid-state drives, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., application 1220) may perform processes including, but not limited to, the aspects, as described herein. Other program modules that may be used in accordance with aspects of the present disclosure may include virtual machines, hypervisors, and other types of applications such as electronic mail and contacts applications, word processing applications, spreadsheet applications, note taking applications, database applications, slide presentation applications, drawing or computer-aided application programs, etc.

Furthermore, embodiments, or portions of embodiments, of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As previously discussed, the aspects and functionalities described herein may operate over distributed systems such as the system 100 described in FIG. 1, where application functionality, memory, data storage and retrieval and various processing functions may be operated remotely from each other over a distributed computing network, such as the Internet or an intranet. Resultantly, users may utilize associated computing devices, such as computing device 111, to interact with the service 102. User interfaces and information of various types may be displayed via on-board computing device displays or via remote display units associated with such computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

According to some example aspects, systems are described. An example system may include one or more servers providing a database service. The database service may include a plurality of clusters, where a cluster of the plurality of clusters includes a plurality of nodes and at least a portion of the plurality of nodes in the cluster host one or more tenant databases of a plurality of tenant databases subscribed to the cluster. At least one of the one or more servers may include at least one processor, and at least one memory coupled to the at least one processor and storing instructions that, when executed by the at least one processor, cause the system to perform operations. The operations may include storing a plurality of traces of resource demand for the plurality of tenant databases, receiving an indication to place a tenant database within the cluster, and for each node of the plurality of nodes of the cluster, estimating a probability of resource violation given a candidate set of co-located tenant databases on the node using select traces from the plurality of traces. The candidate set may include at least the tenant database to be placed, and the select traces may include, for each co-located tenant database of the candidate set, traces sampled from a subset of the plurality of traces of resource demand for a subset of the plurality of tenant databases having one or more shared characteristics with the co-located tenant database. The operations may further include determining a placement for the tenant database within the cluster based on the probability of resource violation estimate for each node.

In other aspects, estimating the probability of resource violation for a node of the cluster may include performing a plurality of simulations, and estimating the probability of resource violation for the candidate set of co-located tenant databases on the node based on the plurality of simulations. Performing a simulation may include: sampling, from the subset of the plurality of traces for each co-located tenant database, a trace of resource demand; replaying the sampled trace of resource demand to predict a resource demand for each co-located tenant database; computing an aggregate resource demand on the node for the candidate set based on the predicted resource demand for each co-located tenant database; and determining whether the aggregate resource demand exceeds a resource violation threshold. The estimated probability of resource violation for the candidate set of co-located tenant databases on the node may be a percentage of the plurality of simulations where the aggregate resource demand is determined to exceed the resource violation threshold. The sampled trace of resource demand may include a demand for a plurality of resource types, where the plurality of resource types may include at least disk space, memory, and central processing unit (CPU) usage. The resource demand for each of the plurality of resource types may be replayed in parallel.

In further aspects, the placement for the tenant database within the cluster may be determined by: estimating, for each node of the cluster, a first probability of resource violation on the node based on tenant databases currently hosted on the node; estimating, for each node of the cluster, a second probability of resource violation on the node if the tenant database is placed on the node with the tenant databases currently hosted on the node; comparing, across the plurality of nodes of the cluster, a difference between the first and second probability of resource violations estimated for each node to determine a lowest increase in probability of resource violation on the node after placing the tenant database on the node; and based on the comparison, if multiple nodes are determined to have a same lowest increase in probability of resource violation after placing the tenant database on the node, applying a modified heuristic to determine a node from the multiple nodes to place the tenant database on. The modified heuristic may be a best-fit heuristic modified to include probability of resource violation estimates or a worst-fit heuristic modified to include probability of resource violation estimates.

In yet further aspects, a plurality of configurations for tenant database placement within the cluster may be determined, scores may be assigned to the plurality of configurations, and a configuration having a lowest assigned score from the plurality of configurations may be selected. Assigning a score to a configuration from the plurality of configurations may include: determining a first number of failovers to achieve the configuration; determining a second number of failovers expected from resource violations by estimating a probability of resource violation on each node of the cluster given the configuration; generating the score based on the first and second number of failovers; adding a first penalty to the score if the configuration includes placement of any tenant databases on a held out node of the cluster; adding a second penalty to the score if the configuration results in resource usage imbalance across the plurality of nodes of the cluster. The second number of failovers expected from resource violations may be the sum over the probability of resource violation across the plurality of nodes of the cluster. The plurality of configurations determined may be a subset of all possible configurations within the cluster based on one or more pre-defined constraints for tenant database placement.

In some aspects, the plurality of traces may be compressed prior to storage. The tenant database to be placed may be a new tenant database subscribed to the cluster or an existing tenant database from the plurality of tenant databases hosted on one of the plurality of nodes of the cluster. One or more of the shared characteristics may include a tenant class, a tenant lifetime, and/or a past resource demand.

According to other example aspects, computer-implemented methods are described. An example computer-implemented may include: storing a plurality of traces of resource demand for a plurality of tenant databases subscribed to a cluster within a database service, where the cluster includes a plurality of nodes and at least a portion of the plurality of nodes host one or more tenant databases of the plurality of tenant databases; receiving an indication to place a tenant database within the cluster; and for each node of the plurality of nodes of the cluster, estimating a probability of resource violation for a candidate set of co-located tenant databases on the node using select traces from the plurality of traces. The candidate set may include at least the tenant database to be placed, and the select traces may include, for each co-located tenant database of the candidate set, traces sampled from a subset of the plurality of traces of resource demand for a subset of the plurality of tenant databases having one or more shared characteristics with the co-located tenant database. The example computer-implemented method may further include determining a placement for the tenant database within the cluster based on the probability of resource violation estimate for each node.

In further example aspects, the probability of resource violation for a node may be estimated by performing a plurality of simulations, and estimating the probability of resource violation for the candidate set of co-located tenant databases on the node based on the plurality of simulations. Each performance of a simulation of the plurality of simulations may include: sampling, from the subset of the plurality of traces for each co-located tenant database, a trace of resource demand; replaying the sampled trace to predict a resource demand for each co-located tenant database; computing an aggregate resource demand on the node for the candidate set based on the predicted resource demand for each co-located tenant database; and determining whether the aggregate resource demand exceeds a resource violation threshold. The estimated probability may be a percentage of the plurality of simulations where the aggregate resource demand is determined to exceed the resource violation threshold.

In yet further aspects, determining the placement for the tenant database within the cluster includes: estimating, for each node of the cluster, a first probability of resource violation on the node based on tenant databases currently hosted on the node; estimating, for each node of the cluster, a second probability of resource violation on the node if the tenant database is placed on the node with the tenant databases currently hosted on the node; comparing, across the plurality of nodes of the cluster, a difference between the first and second probability of resource violations estimated for each node to determine a lowest increase in probability of resource violation on the node after placing the tenant database on the node; and based on the comparison, if multiple nodes are determined to have a same lowest increase in probability of resource violation after placing the tenant database on the node, applying a modified heuristic to determine a node from the multiple nodes to place the tenant database on.

In some aspects, the method may further include determining a plurality of configurations for tenant database placement within the cluster, assigning scores to the plurality of configurations, and selecting, from the plurality of configurations, a configuration having a lowest assigned score. A score may be assigned to a configuration from the plurality of configurations by: determining a first number of failovers to achieve the configuration; determining a second number of failovers expected from resource violations by estimating a probability of resource violation on each node of the cluster given the configuration to yield the sum over the probability of resource violation across all nodes of the cluster; generating the score based on the first and second number of failovers; adding a first penalty to the score if the configuration includes placement of one or more of the plurality of tenant databases on a held out node of the cluster; and adding a second penalty to the score if the configuration results in resource usage imbalance across nodes of the cluster. The method may further include compressing the plurality of traces prior to storing.

According to further example aspects, computer storage media are described. The computer storage media may store instructions, that when executed by a processor, causes the processor to perform operations. The operations may include: storing a plurality of traces of resource demand for a plurality of tenant databases subscribed to a cluster within a database service, where the cluster includes a plurality of nodes and at least a portion of the plurality of nodes in the cluster host one or more tenant databases of the plurality of tenant databases; receiving an indication to place a tenant database within the cluster; and, for each node of the plurality of nodes of the cluster, estimating a probability of resource violation for a candidate set of co-located tenant databases on the node using select traces from the plurality of traces. The candidate set may include at least the tenant database to be placed, and the select traces may include, for each co-located tenant database of the candidate set, traces sampled from a subset of the plurality of traces of resource demand for a subset of the plurality of tenant databases having one or more shared characteristics with the co-located tenant database. The operations may further include determining a placement for the tenant database within the cluster based on the probability of resource violation estimate for each node.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    one or more servers providing a database service, the database service including a plurality of clusters, wherein a cluster of the plurality of clusters includes a plurality of nodes and at least a portion of the plurality of nodes in the cluster host one or more tenant databases of a plurality of tenant databases subscribed to the cluster, and wherein at least one of the one or more servers comprise:
    at least one processor; and
    at least one memory coupled to the at least one processor and storing instructions that, when executed by the at least one processor, cause the system to perform operations comprising:
        storing a plurality of traces of resource demand for the plurality of tenant databases;
        receiving an indication to place a tenant database within the cluster;
        for each node of the plurality of nodes of the cluster, estimating a probability of resource violation given a candidate set of co-located tenant databases on the node using select traces from the plurality of traces, the candidate set including at least the tenant database to be placed, and the select traces including, for each co-located tenant database of the candidate set, traces sampled from a subset of the plurality of traces of resource demand for a subset of the plurality of tenant databases having one or more shared characteristics with the co-located tenant database, wherein the one or more shared characteristics include a tenant class; and based on the probability of resource violation estimate for each node, determining a placement for the tenant database within the cluster.

2. The system of claim 1, wherein estimating the probability of resource violation for a node of the cluster includes operations comprising:

performing a plurality of simulations, wherein performing a simulation comprises:
sampling, from the subset of the plurality of traces for each co-located tenant database, a trace of resource demand;
replaying the sampled trace of resource demand to predict a resource demand for each co-located tenant database;
computing an aggregate resource demand on the node for the candidate set based on the predicted resource demand for each co-located tenant database; and
determining whether the aggregate resource demand exceeds a resource violation threshold;
wherein the probability of resource violation for the candidate set of co-located tenant databases on the node is estimated based on the plurality of simulations.

3. The system of claim 2, wherein the estimated probability of resource violation for the candidate set of co-located tenant databases on the node is a percentage of the plurality of simulations where the aggregate resource demand is determined to exceed the resource violation threshold.

4. The system of claim 2, wherein the sampled trace of resource demand includes a demand for a plurality of resource types, the plurality of resource types including at least disk space, memory, and central processing unit (CPU) usage.

5. The system of claim 4, wherein replaying the sampled trace of resource demand includes operations comprising:
replaying the resource demand for each of the plurality of resource types in parallel.

6. The system of claim 1, wherein determining the placement for the tenant database within the cluster includes operations comprising:
estimating, for each node of the cluster, a first probability of resource violation on the node based on tenant databases currently hosted on the node;
estimating, for each node of the cluster, a second probability of resource violation on the node if the tenant database is placed on the node with the tenant databases currently hosted on the node;
comparing, across the plurality of nodes of the cluster, a difference between the first and second probability of resource violations estimated for each node to determine a lowest increase in probability of resource violation on the node after placing the tenant database on the node; and
based on the comparison, if multiple nodes are determined to have a same lowest increase in probability of resource violation after placing the tenant database on the node, applying a modified heuristic to determine a node from the multiple nodes to place the tenant database on.

7. The system of claim 6, wherein the modified heuristic is one of a best-fit heuristic modified to include probability of resource violation estimates, and a worst-fit heuristic modified to include probability of resource violation estimates.

8. The system of claim 1, wherein the operations further comprise:
determining a plurality of configurations for tenant database placement within the cluster;
assigning scores to the plurality of configurations; and
selecting, from the plurality of configurations, a configuration having a lowest assigned score.

9. The system of claim 8, wherein assigning a score to a configuration from the plurality of configurations includes operations comprising:
determining a first number of failovers to achieve the configuration;
determining a second number of failovers expected from resource violations by estimating a probability of resource violation on each node of the cluster given the configuration;
generating the score based on the first and second number of failovers;
adding a first penalty to the score if the configuration includes placement of any tenant databases on a held out node of the cluster; and
adding a second penalty to the score if the configuration results in resource usage imbalance across the plurality of nodes of the cluster.

10. The system of claim 9, wherein the second number of failovers expected from resource violations is the sum over the probability of resource violation across the plurality of nodes of the cluster.

11. The system of claim 8, wherein the plurality of configurations determined are a subset of all possible configurations within the cluster based on one or more predefined constraints for tenant database placement.

12. The system of claim 1, wherein the operations further comprise:
compressing the plurality of traces prior to storage.

13. The system of claim 1, wherein the tenant database to be placed is one of:
a new tenant database subscribed to the cluster; and
an existing tenant database from the plurality of tenant databases hosted on one of the plurality of nodes of the cluster.

14. The system of claim 1, wherein the one or more shared characteristics further include at least one of a tenant lifetime or a past resource demand.

15. A computer-implemented method comprising:
storing a plurality of traces of resource demand for a plurality of tenant databases subscribed to a cluster within a database service, wherein the cluster includes a plurality of nodes and at least a portion of the plurality of nodes host one or more tenant databases of the plurality of tenant databases;
receiving an indication to place a tenant database within the cluster;
for each node of the plurality of nodes of the cluster, estimating a probability of resource violation for a candidate set of co-located tenant databases on the node using select traces from the plurality of traces, the candidate set including at least the tenant database to be placed, and the select traces including, for each co-located tenant database of the candidate set, traces sampled from a subset of the plurality of traces of resource demand for a subset of the plurality of tenant databases having one or more shared characteristics with the co-located tenant database, wherein the one or more shared characteristics include a tenant class; and based on the probability of resource violation estimate for each node, determining a placement for the tenant database within the cluster.

16. The method of claim 15, wherein estimating the probability of resource violation for a node comprises:
performing a plurality of simulations, each performance of a simulation of the plurality of simulations comprising:
sampling, from the subset of the plurality of traces for each co-located tenant database, a trace of resource demand;
replaying the sampled trace to predict a resource demand for each co-located tenant database;
computing an aggregate resource demand on the node for the candidate set based on the predicted resource demand for each co-located tenant database; and
determining whether the aggregate resource demand exceeds a resource violation threshold; and
estimating the probability of resource violation for the candidate set of co-located tenant databases on the node based on the plurality of simulations, wherein the estimated probability is a percentage of the plurality of simulations where the aggregate resource demand is determined to exceed the resource violation threshold.

17. The method of claim 15, wherein determining the placement for the tenant database within the cluster, comprises:
estimating, for each node of the cluster, a first probability of resource violation on the node based on tenant databases currently hosted on the node;
estimating, for each node of the cluster, a second probability of resource violation on the node if the tenant database is placed on the node with the tenant databases currently hosted on the node;
comparing, across the plurality of nodes of the cluster, a difference between the first and second probability of resource violations estimated for each node to determine a lowest increase in probability of resource violation on the node after placing the tenant database on the node; and
based on the comparison, if multiple nodes are determined to have a same lowest increase in probability of resource violation after placing the tenant database on the node, applying a modified heuristic to determine a node from the multiple nodes to place the tenant database on.

18. The method of claim 15, method further comprising:
determining a plurality of configurations for tenant database placement within the cluster;
assigning scores to the plurality of configurations, wherein a score is assigned to a configuration from the plurality of configurations by:
determining a first number of failovers to achieve the configuration;
determining a second number of failovers expected from resource violations by estimating a probability of resource violation on each node of the cluster given the configuration to yield the sum over the probability of resource violation across all nodes of the cluster;
generating the score based on the first and second number of failovers;
adding a first penalty to the score if the configuration includes placement of one or more of the plurality of tenant databases on a held out node of the cluster; and
adding a second penalty to the score if the configuration results in resource usage imbalance across nodes of the cluster; and
selecting, from the plurality of configurations, a configuration having a lowest assigned score.

19. The method of claim 15, further comprising:
compressing the plurality of traces prior to storing.

20. Computer storage media storing instructions, that when executed by a processor, causes the processor to perform operations comprising:
storing a plurality of traces of resource demand for a plurality of tenant databases subscribed to a cluster within a database service, wherein the cluster includes a plurality of nodes and at least a portion of the plurality of nodes in the cluster host one or more tenant databases of the plurality of tenant databases;
receiving an indication to place a tenant database within the cluster;
for each node of the plurality of nodes of the cluster, estimating a probability of resource violation for a candidate set of co-located tenant databases on the node using select traces from the plurality of traces, the candidate set including at least the tenant database to be placed, and the select traces including, for each co-located tenant database of the candidate set, traces sampled from a subset of the plurality of traces of resource demand for a subset of the plurality of tenant databases having one or more shared characteristics with the co-located tenant database, wherein the one or more shared characteristics include a tenant class; and
based on the probability of resource violation estimate for each node, determining a placement for the tenant database within the cluster.

* * * * *